US009165185B2

(12) United States Patent
Hamel et al.

(10) Patent No.: US 9,165,185 B2
(45) Date of Patent: Oct. 20, 2015

(54) OPTICAL CHARACTER RECOGNITION OF TEXT IN AN IMAGE ACCORDING TO A PRIORITIZED PROCESSING SEQUENCE

(71) Applicant: TECHNOLOGIES HUMANWARE INC., Drummondville (CA)

(72) Inventors: Pierre Hamel, Verdun (CA); Alain Bélanger, Longueuil (CA); Éric Beauchamp, La Prairie (CA)

(73) Assignee: Technologies Humanware Inc., Quebec (CA)

( * ) Notice: Subject to any disclaimer, the term of this patent is extended or adjusted under 35 U.S.C. 154(b) by 0 days.

(21) Appl. No.: 14/256,228

(22) Filed: Apr. 18, 2014

(65) Prior Publication Data

US 2014/0314338 A1 Oct. 23, 2014

Related U.S. Application Data

(60) Provisional application No. 61/814,479, filed on Apr. 22, 2013.

(51) Int. Cl.
*G06K 9/00* (2006.01)
*G06K 9/34* (2006.01)

(52) U.S. Cl.
CPC ............ *G06K 9/00442* (2013.01); *G06K 9/344* (2013.01)

(58) Field of Classification Search
CPC ... G06K 9/344; G06K 9/228; G06K 9/00442; G06K 9/00449; G06K 9/00456; G06K 7/1447; G06K 9/34; G06K 9/342; G06K 9/2054; G06K 9/00852
See application file for complete search history.

(56) References Cited

U.S. PATENT DOCUMENTS

| 5,134,669 | A * | 7/1992 | Keogh et al. | 382/318 |
| 2009/0316999 | A1 * | 12/2009 | Kim et al. | 382/209 |
| 2012/0213429 | A1 * | 8/2012 | Vasudevan et al. | 382/162 |
| 2013/0236111 | A1 * | 9/2013 | Pintsov | 382/224 |

* cited by examiner

*Primary Examiner* — Brian Le
(74) *Attorney, Agent, or Firm* — Hovey Williams LLP

(57) ABSTRACT

A computer-implemented method for providing a text-based representation of a region of interest of an image to first is provided that includes a step of identifying text zones within the image, each text zone including textual content and having a respective rank assigned thereto based on an arrangement of the text zones within the image. The method also includes determining a processing sequence for performing optical character recognition (OCR) on the text zones. The processing sequence is based, firstly, on an arrangement of the text zones with respect to the region of interest and, secondly, on the ranks assigned to the text zones. The method further includes performing an OCR process on the text zones according to the processing sequence to progressively obtain a machine-encoded representation of the region of interest, and concurrently present the machine-encoded representation to the user, via an output device, as the text-based representation.

17 Claims, 13 Drawing Sheets

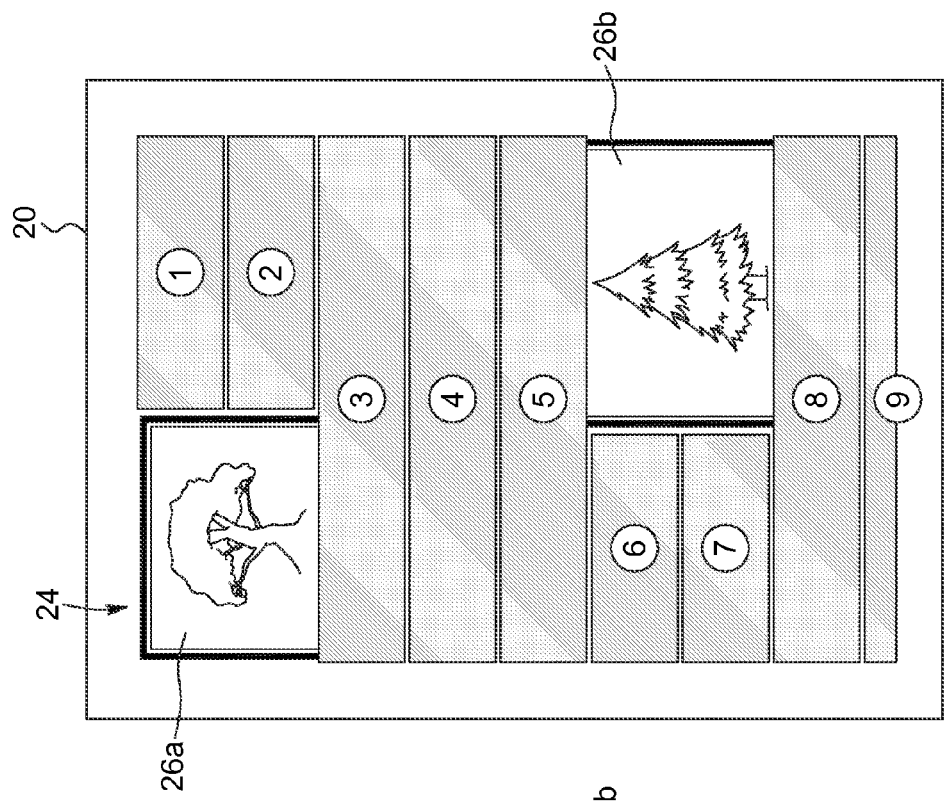
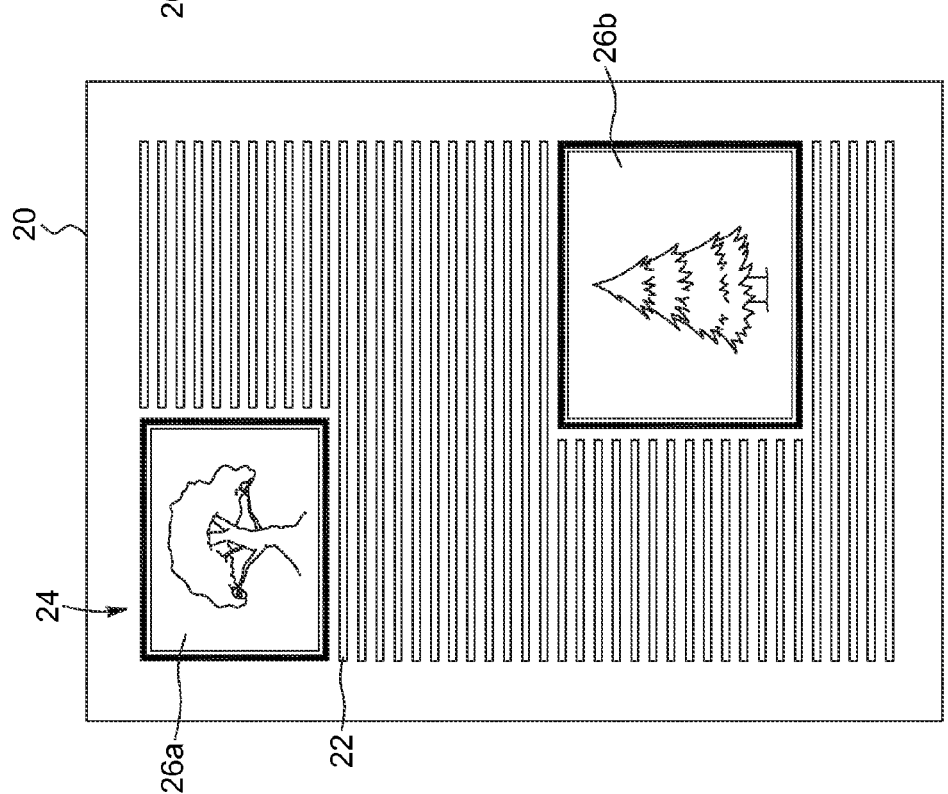

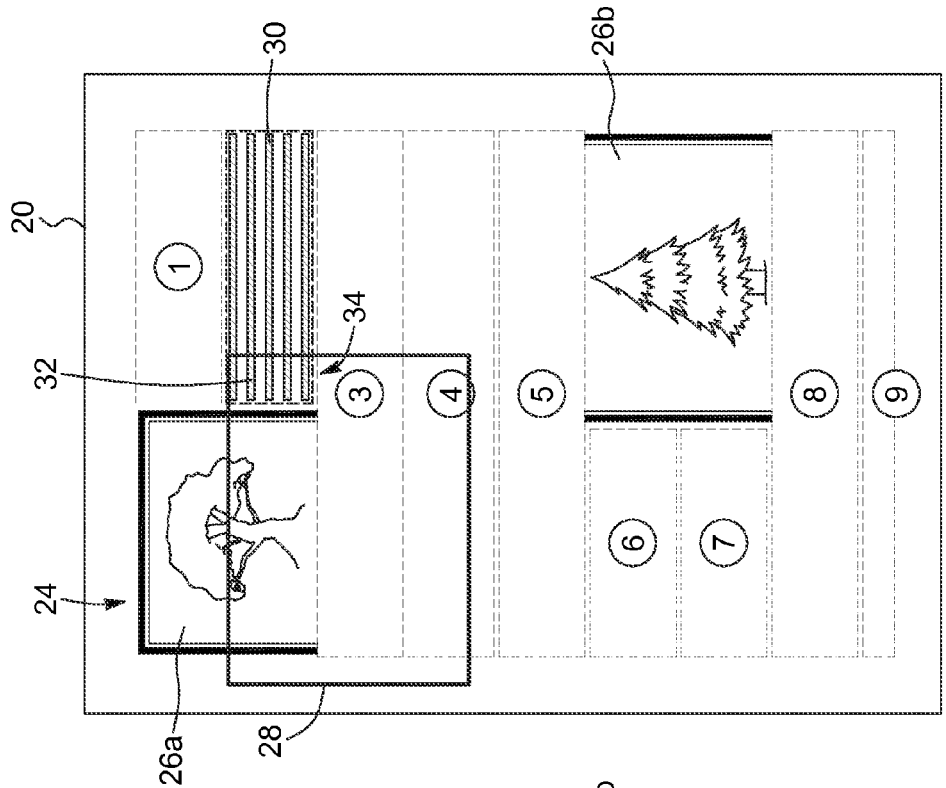
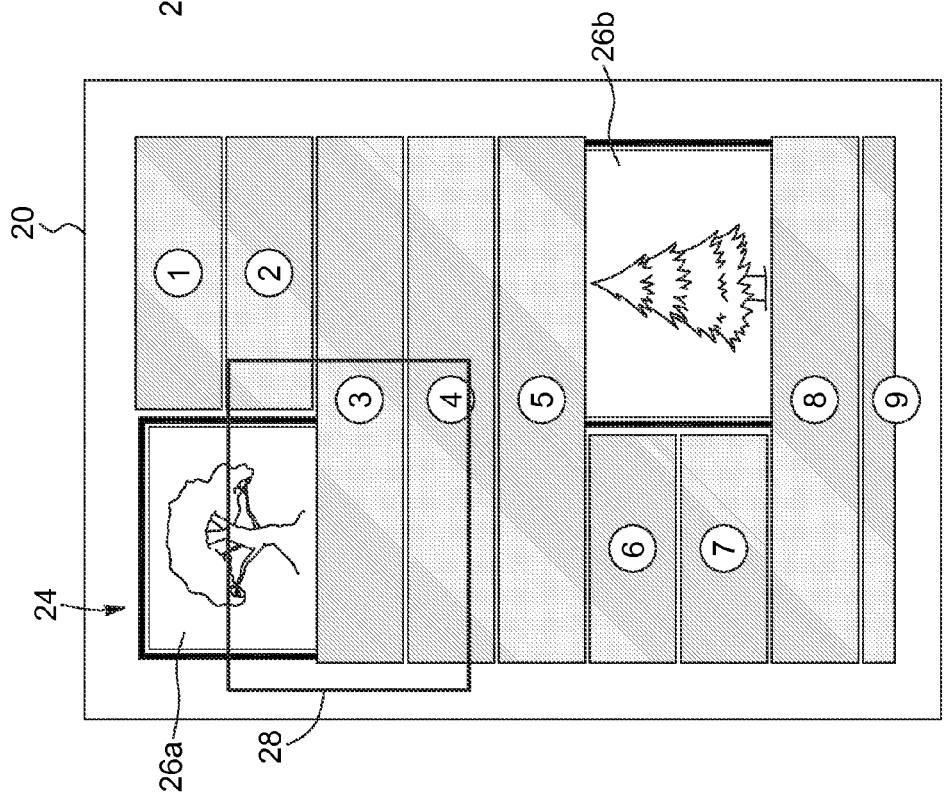

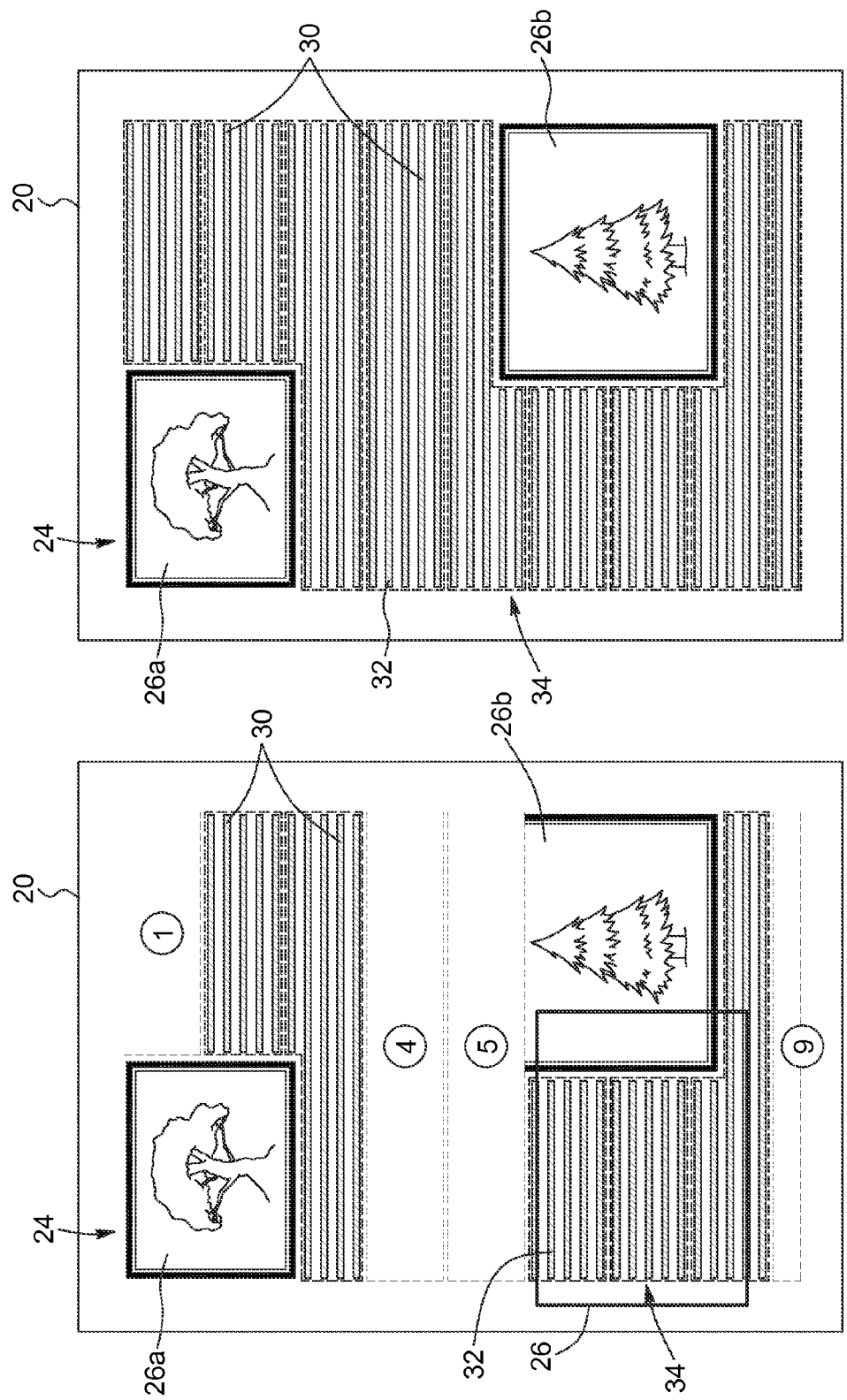

OPTICAL CHARACTER RECOGNITION OF TEXT IN AN IMAGE ACCORDING TO A PRIORITIZED PROCESSING SEQUENCE

RELATED APPLICATION

This application claims priority benefit of a provisional application entitled, "METHOD AND SYSTEM USING TWO PARALLEL OPTICAL CHARACTER RECOGNITION PROCESSES," Ser. No. 61/814,479, filed Apr. 22, 2013 and incorporated by reference herein in its entirety.

TECHNICAL FIELD

The present invention generally relates to the field of presenting contents using optical character recognition (OCR) processes, and more particularly concerns a method and a system using OCR to provide, according to a processing sequence, a text-based representation of a region of interest of an image to a user.

BACKGROUND

Optical character recognition (OCR) is the process of converting scanned, photographed or other bitmap-formatted images of text (printed, handwritten, typewritten or otherwise) into machine-encoded text that can be read and manipulated by a computer. OCR is a common method of digitizing printed texts so that they can be electronically edited, searched and stored more compactly. OCR is used in various fields including, for example: machine translation, text-to speech synthesis, key data entry and extraction, text mining, book scanning, and assistive technology for low-vision and blind individuals. In particular, OCR technology offers low-vision and blind individuals the capacity to access textual content in images by means of magnification devices and devices providing an audio or Braille output.

Low vision may be generally referred to as a condition where ordinary eye glasses, lens implants or contact lenses are not sufficient for providing sharp sight. The largest growing segment of the low-vision population in developed countries is expected to be people aged 65 years old and older. This is mainly due to age-related eye diseases such as macular degeneration, glaucoma and diabetic retinopathy, cataract, detached retina, and retinitis pigmentosa. Some people are also born with low vision. Low-vision individuals often find it difficult, if not impossible, to read small writing or to discern small objects without high levels of magnification. This limits their ability to lead an independent life because reading glasses and magnifying glass typically cannot provide sufficient magnification for them. In the case of legally blind individuals, access to textual content in an image can be provided by using adaptive technology devices that provide speech or braille output. In order to assist low-vision and blind individuals in performing daily tasks, various devices and systems are known in the art.

Among such devices and systems, desktop video magnifiers generally include a video monitor mounted on a stand having a gooseneck shape. A camera having a large optical zoom is installed on the stand over a working area on which a user disposes an object to be magnified, typically a document with textual content that the user wishes to access. The camera feeds a video processor with a video signal of a portion of the working area, and the video processor in turn feeds this video signal with an increased sharpness and enhanced contrast to the video monitor. Conventional video magnifiers can be provided with OCR capabilities to allow low-vision individuals to access textual information. Once extracted from the image, the machine-encoded text may be displayed to a user as suitably magnified text on a monitor, or be fed to and read aloud by a text-to-speech system, or be presented as Braille content by a Braille display system.

While OCR methods and systems employed in conventional video magnifiers have certain advantages, they also have some drawbacks and limitations. For example, because the cameras employed in such video magnifiers generally have a relatively narrow field of view that covers only a portion of a standard-paper-size document, OCR can only be performed on a corresponding narrow portion of the document. In particular, reading the textual content of an image is made slower, less smooth and less efficient by the fact that OCR cannot be performed on the portions of an image which have yet to be presented to the user but must be performed every time the user brings a new portion of the document within the field of view of the camera.

There is therefore a need in the art for OCR methods and systems that can make the reading of the textual content of an entire image more fluid and convenient, while also alleviating at least some of the drawbacks of the prior art.

SUMMARY

According to an aspect of the invention, there is provided a computer-implemented method for providing a text-based representation of a region of interest of an image to a user. The method includes the steps of:

identifying text zones within the image, each text zone including textual content and having a respective rank assigned thereto based on an arrangement of the text zones within the image;

determining a processing sequence for performing OCR on the text zones, the processing sequence being based, firstly, on an arrangement of the text zones with respect to the region of interest and, secondly, on the ranks assigned to the text zones; and performing an OCR process on the text zones according to the processing sequence to progressively obtain a machine-encoded representation of the region of interest, and concurrently present the machine-encoded representation to the user, via an output device, as the text-based representation.

According to another aspect of the invention, there is provided a computer readable memory storing computer executable instructions thereon that when executed by a computer perform the method steps as described above.

According to another aspect of the invention, there is provided a method for providing a text-based representation of a portion of a working area to a user. The method includes the steps of:

acquiring an image of the entire working area;

identifying text zones within the image, each text zone including textual content and having a respective rank assigned thereto based on an arrangement of the text zones within the image;

determining a processing sequence for performing OCR on the text zones, the processing sequence being based, firstly, on an arrangement of the text zones with respect to a region of interest of the image corresponding to the portion of the working area and, secondly, on the ranks assigned to the text zones; and performing an OCR process on the text zones according to the processing sequence to progressively obtain a machine-encoded representation of the portion of the working area, and concurrently present the machine-encoded representation to the user as the text-based representation.

According to another aspect of the invention, there is provided a system for providing a text-based representation of a portion of a working area to a user. The system includes:

a camera unit disposed over the working area and having an image sensor acquiring an image of the entire working area; and a processing unit receiving the image from the camera unit and including:

a zoning module identifying text zones within the image, each text zone including textual content and having a respective rank assigned thereto based on an arrangement of the text zones within the image;

a sequencing module determining a processing sequence for performing OCR on the text zones, the processing sequence being based, firstly, on an arrangement of the text zones with respect to a region of interest of the image corresponding to the portion of the working area and, secondly, on the ranks assigned to the text zones;

an OCR module performing an OCR process on the text zones according to the processing sequence to progressively obtain a machine-encoded representation of the portion of the working area; and an output module concurrently outputting, as the text-based representation, the machine-encoded representation of the portion of the working area.

Other features and advantages of embodiments of the present invention will be better understood upon reading of preferred embodiments thereof with reference to the appended drawings.

BRIEF DESCRIPTION OF THE DRAWINGS

FIGS. 3A to 3H illustrate steps performed on an image by carrying out a method for providing a text-based representation of a region of interest of the image to a user, in accordance with an exemplary embodiment.

DETAILED DESCRIPTION

Figure 1:
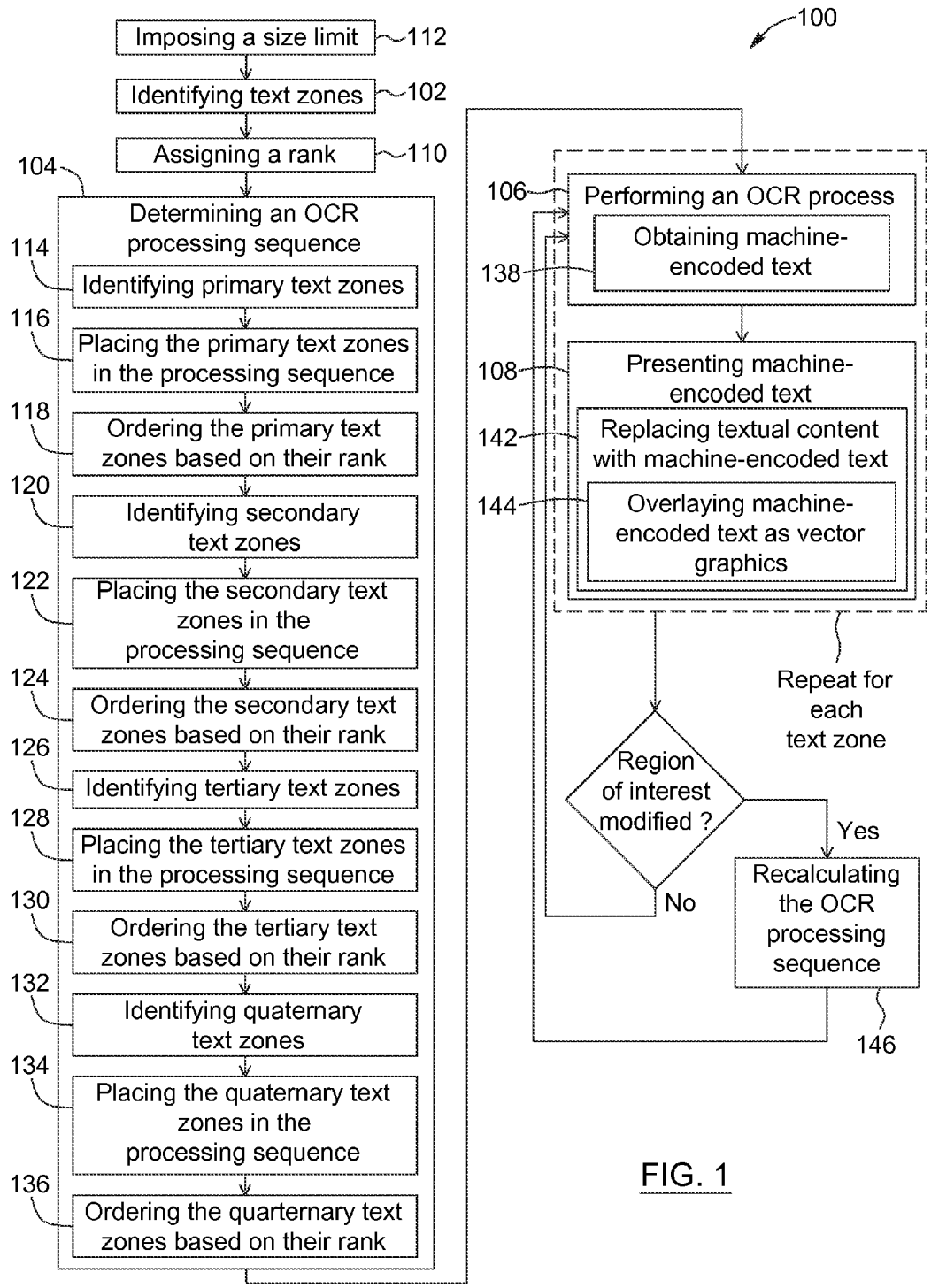
FIG. 1 is a flow diagram of a method for providing a text-based representation of a region of interest of an image to a user, in accordance with an exemplary embodiment.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.

The present description generally relates to a computer-implemented method for providing a text-based representation of a region of interest of an image to a user, as well as to a computer readable memory storing computer executable instructions thereon that when executed by a computer perform the method. The present description also relates to a method and system for providing a text-based representation of a portion of a working area to a user.

As described in greater detail below, embodiments of the present invention generally rely on the use of optical character recognition (OCR). Throughout the present description, the term "optical character recognition" and the corresponding acronym "OCR" are used to refer to the operation of performing image processing on an image to extract textual content therefrom. Optical character recognition generally involves processes and systems capable of translating images into machine-encoded text (e.g., ASCII or Unicode).

The output of an OCR process may be presented to a user according to various formats. As used herein, the term "text-based representation" generally refers to the form in which the machine-encoded text extracted using OCR is presented to the user, via an output device. In one exemplary embodiment, the output device can be a visual display unit, such as for example a monitor, providing a visual representation of the machine-encoded text as the text-based representation. Alternatively or additionally, the output device can be an audio display device or a Braille display device respectively presenting the machine-encoded text as an audio output (e.g., synthesized speech) or a Braille output.

Embodiments of the present invention may be useful in any application where it is necessary or desirable to present, using OCR, the text content of an image to a user in a manner that prioritizes the region of interest of the image currently selected by the user, while enabling OCR processing of the remainder of the image. Embodiments of the present invention may be of particular use in magnification systems such as the one illustrated in FIG. 3. An example of such a system is also described in U.S. patent application Ser. No. 13/724,896 entitled "Magnification system", the contents of which are incorporated herein by reference in their entirety.

Broadly described, the exemplary system 200 of FIG. 3 includes a display unit 218 mounted on a frame structure 224. A camera unit 202 is mounted on the frame structure 224 and has a field of view 222 encompassing a working area 204. The working area 204 is typically a flat surface on which a user may place an object to be magnified or otherwise viewed on the display unit 218. For example, the object may be a document 220 the user wishes to read. It is understood that in the present description, and unless stated otherwise, the term "reading" is meant to encompass "visual reading" as well as "non-visual reading" such as text-to-speech reading and Braille reading. The camera unit 202 acquires live video data of the document 220 disposed on the working area 204 and feeds the same to a video processor of the system 200. In turn, the video processor feeds this live video data to the display unit 218 where it can be displayed to the user. The system 200 includes a user interface 226 for receiving instructions from a user. When used in connection with the exemplary system 200 of FIG. 3, embodiments of the present invention can involve acquiring a high-resolution image of the document 220 laid on the working area 204 using the camera unit 202, and subsequently performing OCR on the acquired image to extract textual content therefrom and generate a text-based representation of the document 220 that can be displayed to a user on the visual display unit 218.

It is to be emphasized, however, that the system of FIG. 3 is provided for illustrative purposes only, and that embodiments of the present invention can be performed with or embodied by any system or device capable of performing the OCR processes described herein. In particular, while some embodiments of the invention may be targeted to low-vision individuals, one of ordinary skill in the art will understand that embodiments of the invention could, in general, be used by any person desiring that textual content from an image be extracted using OCR and presented to him or her in a fast, efficient, and logical manner. More particularly, embodiments of the present invention can be of use to people who cannot or find it difficult to access printed text, including legally blind individuals and individuals with cognitive disabilities and/or learning disabilities.

Figure 2:
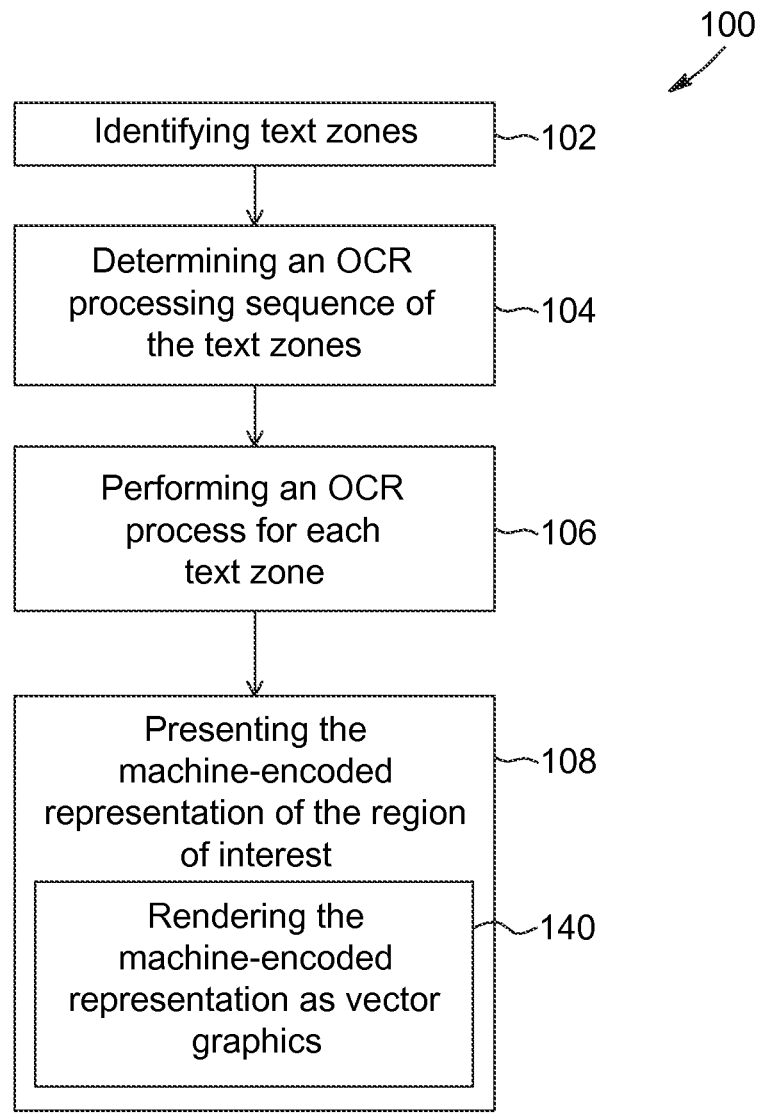
FIG. 2 is a flow diagram of a method for providing a text-based representation of a region of interest of an image to a user, in accordance with another exemplary embodiment.

Method for Providing a Text-based Representation of a Region of Interest of an Image In accordance with an aspect of the invention, and with particular reference to FIGS. 1 to 3H, there is provided a method 100 for providing a text-based representation of a region of interest of an image to a user. In particular, FIGS. 1 and 2 show flow diagrams of exemplary embodiments of the method 100 which, by way of example, can be performed with a system 200 like that shown in FIG. 7 or another system or device. FIGS. 3A to 3H illustrate processing steps performed on an image 20 by carrying out a method like that shown in FIGS. 1 and 2.

Broadly described, the method 100 illustrated in FIGS. 1 and 2 provides a text-based representation of a region of interest of an image to a user using OCR. The method 100 involves an identification of text zones within the image (step 102), followed by a determination of a processing sequence for performing OCR on the text zones (step 104). The processing sequence is determined so that it prioritizes the processing of region of interest of the image. Prioritizing the region of interest can be achieved by placing earlier (i.e., ahead) in the processing sequence one or more text zones overlapping at least partially (i.e., intersecting) the region of interest. Once the processing sequence is determined, the method 100 further involves performing an OCR process on the text zones according to the processing sequence (step 106) so as to progressively obtain a machine-encoded representation of the region of interest of the image. As the machine-encoded representation of the region of interest is progressively obtained, it can be concurrently presented to the user, via an output device, as the text-based representation (step 108).

The image 20 illustrated in FIGS. 3A to 3H can be a bitmap image stored as an array of pixels, where each pixel includes color and brightness information corresponding to a particular location in the image 20. The image 20 can have a resolution of at least 2 megapixels. For example, in an exemplary embodiment, the image 20 can have a resolution of 8 megapixels (e.g., an array of 3264×2448 pixels) in RGBA format at 32 bits per pixel. One of ordinary skill in the art will recognize that these resolution values are for illustrative purposes only and that other values can be used in other embodiments.

As used herein, the term "bitmap" or "raster graphics" refers to pixel-based graphics, according to which images are represented as a collection of pixels, commonly arranged in a rectangular array. Bitmap graphics are resolution-dependent and cannot be scaled up to an arbitrary size without sacrificing a degree of apparent image quality. The term "bitmap graphics" is typically used in contrast to the term "vector graphics", which are resolution-independent and can thus be readily represented at any desired resolution.

Figure 7:
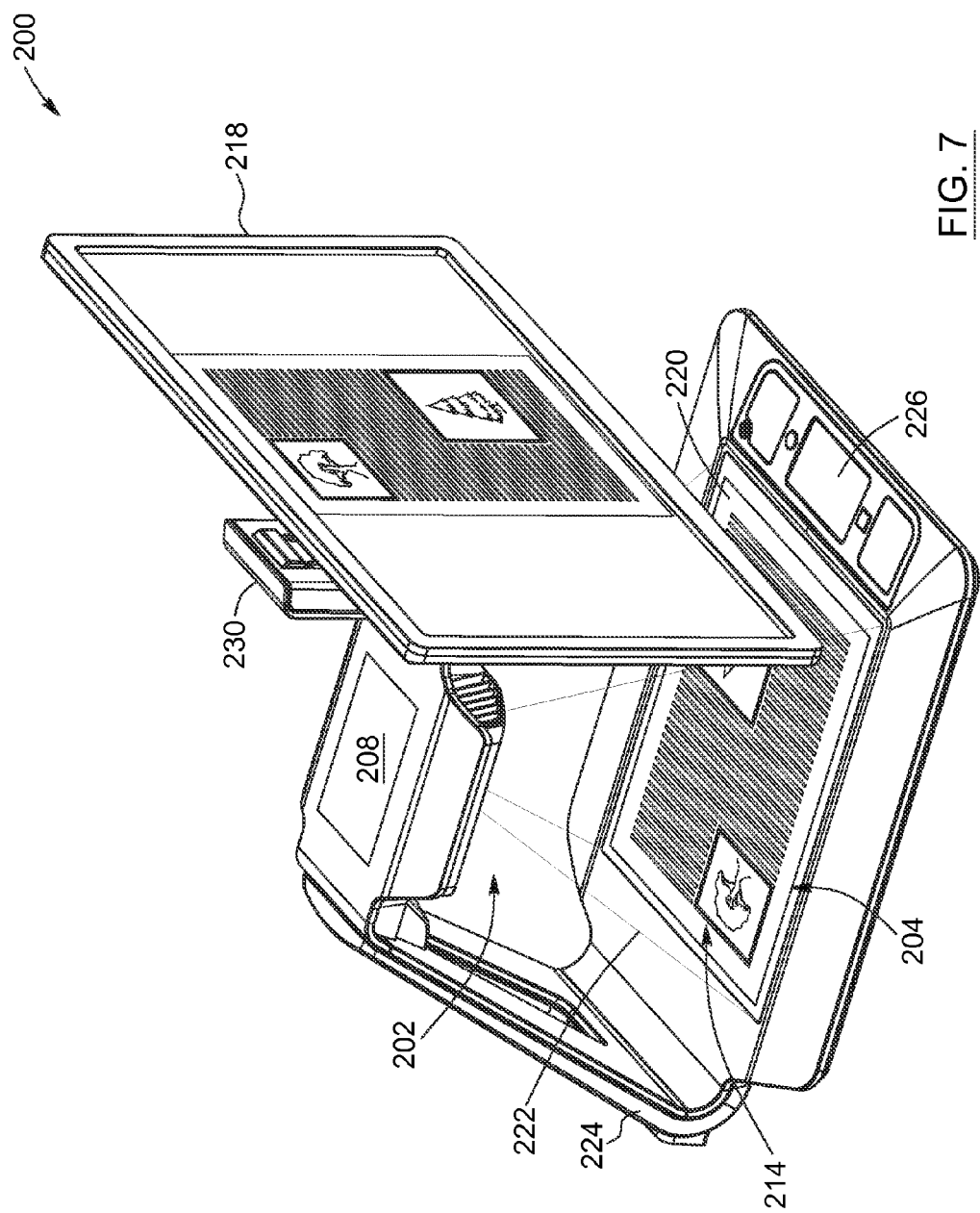
FIG. 7 is a perspective side view of a system for providing a text-based representation of a portion of a working area to a user, in accordance with an exemplary embodiment.

In FIGS. 3A to 3H, the bitmap image 20 corresponds to the image of a document, which corresponds to the document 220 shown in FIG. 7. The page may have a width and a length similar to or greater than standard paper sizes such as, for example, Letter (215.9 mm×279.4 mm), A3 (297 mm×420 mm), A4 (210 mm×297 mm), and A5 (148 mm×210 mm). Of course, in other embodiments the image need not be the image of a document. In particular, the image may be embodied by any image with textual content which can be recognized and translated into machine-encoded text using OCR. In particular, the image need not be acquired immediately prior to display by a camera associated with the device carrying out the method, but may already be provided in electronic format from a different source such as a web page, an electronic message, a storage medium, etc.

Figure 3F:
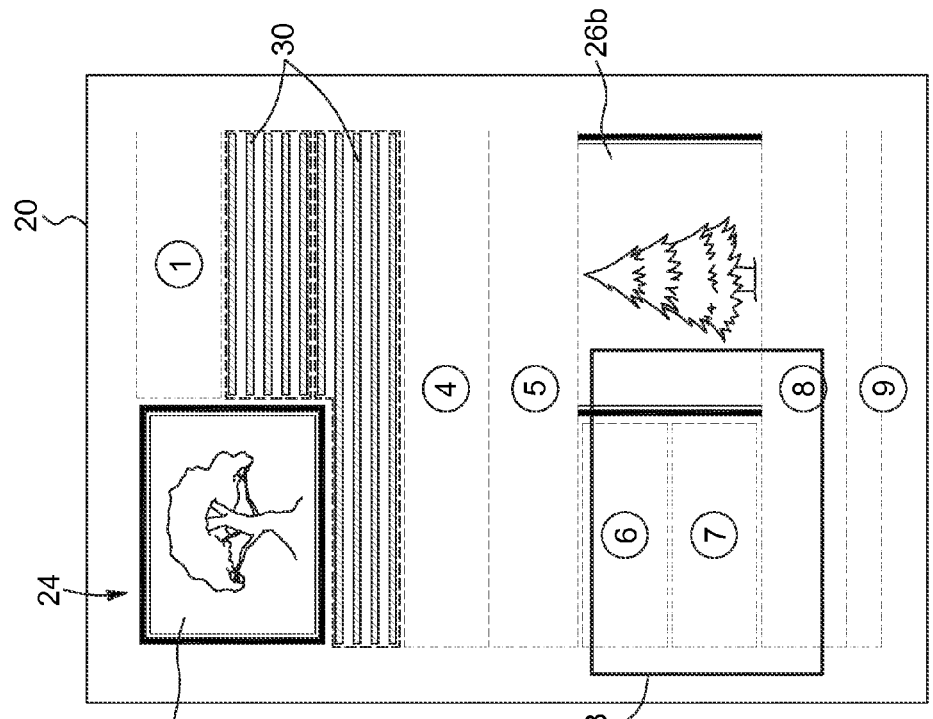

In the exemplary embodiment of FIG. 3A, the image 20 includes both textual content 22 and non-textual content 24. The textual content 22 can include, without limitation, printed, typewritten, handwritten and embossed text. Throughout the drawings, each line of textual content in bitmap format is schematically represented by a thin elongated rectangular strip with unhatched interior (see FIG. 3A). The non-textual content 24 can include, for example, pictures, tables, line graphics, and the like. By way of example, the non-textual content 24 in the image 20 of FIGS. 3A to 3H includes a first picture 26a and a second picture 26b.

At the start of the method 100 of FIGS. 1 and 2, the image can be already stored in a readable memory of the system or device used for carrying out the method 100. Alternatively, the method 100 can include a preliminary step of acquiring the image using, for example, a camera provided with an image sensor, imaging optics, and camera circuitry in communication with the readable memory storing the image. The image acquisition can be triggered by instructions received from the user, or automatically, for example when an absence of movement or another capture trigger parameter is detected for a predetermined period of time. It will be understood that the image can be acquired using any appropriate optical imaging device or combination of devices apt to detect emitted or reflected optical radiation and to use the detected optical radiation to generate the image. It will also be appreciated that providing a high-resolution image can allow a user to zoom in on and display a limited region of interest 26 of the image 20 without suffering from a perceived loss of resolution (see, e.g., FIGS. 5 and 6).

As used herein, the term "region of interest" is intended to refer to a portion of the image (e.g., an area in pixels×pixels of the image) that contains information of interest to a user. In particular, the region of interest corresponds to the portion of the image whose text-based representation is to be provided to a user by performing the method according to embodiments of the invention. Throughout the drawings, the region of interest 28 is outlined by a thick solid-line rectangle (see, e.g., FIGS. 3C to 3G). Of course, the region of interest may assume other shapes in other embodiments. The region of interest 28 may be visually displayed to a user on a monitor at a selected magnification level.

Identification of Text Zones

Referring back to FIGS. 1 and 2, the method 100 first includes a step 102 of identifying text zones within the image 20. Each text zone includes textual content 22 therein and has a respective rank 1 to 9 assigned thereto, which is different for each text zone. In the foregoing, and for convenience, the text zones will be referred to by their respective ranks 1 to 9. Throughout the drawings, the text zones 1 to 9 are represented by cross-hatched rectangles with uniform hatching (see, e.g., FIGS. 3B and 3C).

The identification of the text zones is followed by a step 110 of assigning a rank to each text zone 1 to 9 based on the arrangement of the text zones 1 to 9 within the image 20. The ranks are assigned to the text zones without having regard to the position and size of the region of interest 28 within the image 20 or to the arrangement of the text zones with respect to the region of interest 28. As a result, the rank assigned to each text zone remains unaffected by a change in position and/or in size of the region of interest 28 (see, e.g., FIGS. 3E and 3F). In some embodiments, the rules according to which the text zones 1 to 9 are ranked can be based on the order in which the textual content 22 of the image 20 would normally or logically be read by a user. For example, in FIG. 3B, text zone 1 is the uppermost text zone in the image 20, text zone 2 is located immediately below text zone 1, text zone 3 is located immediately below text zone 2, and so forth. However, it will be understood that embodiments of the invention are not limited to a particular set of rules for ranking the text zones, as long as each text zone has a rank assigned thereto based on the arrangement of the text zones within the image.

In some embodiments, the identification 102 of the text zones 1 to 9 can be preceded by an optional step 112 of imposing a size limit on the text zones 1 to 9. For example, in FIG. 3B, each text zone includes a maximum of five lines of text. As discussed in greater detail below, imposing a maximum size to the text zones can reduce the time involved to complete the OCR process on the one or more text zones intersecting the region of interest 28 of the image 20 (see, e.g., text zones 2, 3 and 4 in FIG. 3C).

Determination of the OCR Processing Sequence

Referring back to FIGS. 1 and 2, the method 100 also includes a step 104 of determining a processing sequence for performing OCR on the text zones 1 to 9. The processing sequence is based, firstly, on an arrangement of the text zones with respect to the region of interest and, secondly, on the ranks assigned to the text zones. In particular, the processing sequence is determined so that at least one text zone intersecting the region of interest is placed earlier (i.e., ahead) in the processing sequence than any other text zone. As a result, depending on the position and size of the region of interest within the image, the rank according to which the text zones are placed in the processing sequence can either differ from or coincide with the ranks assigned to the text zones based on their arrangement within the image.

First Example of Priority Rules for Determining the OCR Processing Sequence

A first exemplary, non-limiting set of priority rules for determining the OCR processing sequence will now be described, with reference to FIGS. 1 and 3A to 3H. Of course, in other embodiments, the processing sequence according to which the text zones are processed could be determined based on a different set of priority rules.

First, in FIG. 1, the step 104 of determining the OCR processing sequence can include a substep 114 of identifying, among the text zones, at least one primary text zone, each of which intersects the region of interest. This can be followed by a substep 116 of placing the at least one primary text zone at the beginning of the processing sequence. The identification 114 of primary text zones intersecting the region of interest and their placement 116 at the beginning of the processing sequence ensures that OCR is performed prioritarily on the textual content of the image located within the region of interest presented to the user.

In some embodiments, the size of the region of interest and its position within the image can be dynamically calculated, for example by receiving panning and zooming instructions from a user. Once the position and size of the region of interest are assessed, each text zone intersecting the region of interest can be identified. In FIG. 3C, the text zones intersecting the region of interest 28 are text zones 2, 3 and 4, which are identified as primary text zones and placed at the beginning of the processing sequence. In some embodiments, only one primary text zone may be identified. In such a case, this single primary text zone is placed at the beginning at the processing sequence. On the contrary, if more than one primary text zone is identified, the determination of the processing sequence can include a substep 118 of ordering the primary text zones according to the respective rank thereof. For example, in FIG. 3C, the primary text zones 2, 3, and 4 will be ordered in the processing sequence according to their rank: primary text zone 2, followed by primary text zone 3, and followed by primary text zone 4.

Referring back to FIG. 1, the step 104 of determining the OCR processing sequence can also include a substep 120 of identifying, among the text zones, at least one secondary text zone, each of which is ranked between a highest-ranked and a lowest-ranked of the at least one primary text zone. The at least one secondary text zone is placed 122 in the processing sequence immediately after the at least one primary text zone. Furthermore, when more than one secondary text zone is identified, the secondary text zones can be ordered 124 according to their respective rank.

In FIG. 3C, the highest-ranked and lowest-ranked of the primary text zones are primary text zones 2 and 4, respectively. The only text zone ranked between primary text zone 2 and primary text zone 4 is thus text zone 3, which has already been identified as a primary text zone. Accordingly, in the example shown in FIG. 3C, none of the text zones 1 to 9 is identified as a secondary text zone.

Figure 4:
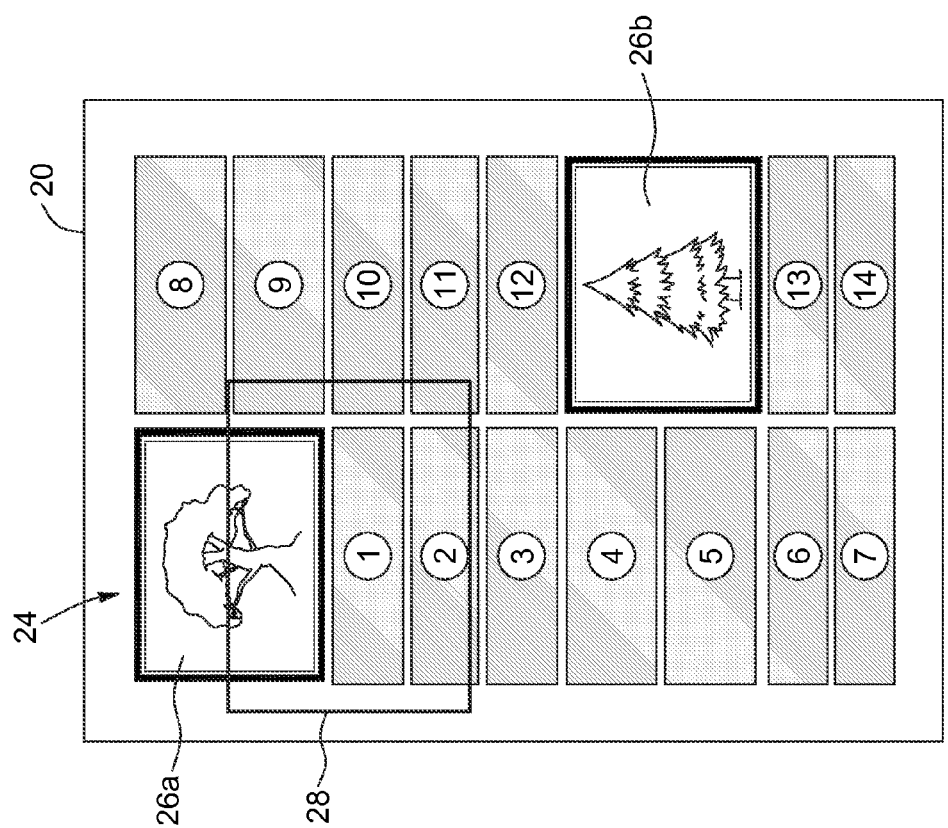
FIG. 4 illustrates another example of an image on which a method for providing a text-based representation of a region of interest of the image to a user can be performed.

Of course, in another embodiment, one or more of the text zones can be identified as secondary text zones. Referring to FIG. 4, in another example of an image 20 on which the method of FIG. 1 can be performed, the primary text zones intersecting the region of interest 28 are text zones 1, 2, 9, 10 and 11. The highest-ranked and lowest-ranked of the primary text zones are respectively text zones 1 and 11, so that the secondary text zones are text zones 3 to 8. The secondary text zones 3 to 8 are placed in the processing sequence immediately after the primary text zones 1, 2, 9, 10 and 11, and are ordered according to their rank: secondary text zone 3, followed by secondary text zone 4, and so on through secondary text zone 8.

Referring back to FIG. 1, the step 104 of determining the OCR processing sequence can further include a substep 126 of identifying, among the text zones, at least one tertiary text zone, each of which is ranked below the lowest-ranked of the at least one primary text zone. The at least one tertiary text zone is placed 128 in the processing sequence immediately after the at least one secondary text zone. Furthermore, when more than one tertiary text zone is identified, the tertiary text zones can be ordered 130 according to their respective rank.

In FIG. 3C, the lowest-ranked of the primary text zones is primary text zone 4. The text zones ranked below primary text zone 4 and identified as the tertiary text zones are thus text zones 5 to 9. The tertiary text zones 5 to 9 are placed in the processing sequence immediately after the primary text zones 2, 3 and 4 (there are no secondary text zone in the example of FIG. 3C), and are ordered according to their rank: tertiary text zone 5, followed by tertiary text zone 6, and so on through tertiary text zone 9.

Likewise, in FIG. 4, the lowest-ranked of the primary text zones is primary text zone 11. The text zones ranked below primary text zone 11 and identified as the tertiary text zones are thus text zones 12 to 14. The tertiary text zones 12 to 14 are placed in the processing sequence immediately after the secondary text zones 3 to 8, and are ordered according to their rank: tertiary text zone 12, followed by tertiary text zone 13, and followed by tertiary text zone 14.

Referring back to FIG. 1, the step 104 of determining the OCR processing sequence can further include a substep 132 of identifying, among the text zones, at least one quaternary text zone, each of which is ranked above the highest-ranked of the at least one primary text zone. The at least one quaternary text zone is placed 134 in the processing sequence immediately after the at least one tertiary text zone. Furthermore, when more than one quaternary text zone is identified, the quaternary text zones can be ordered 136 according to their respective rank.

In FIG. 3C, the highest-ranked of the primary text zones is primary text zone 2. The text zones ranked above primary text zone 2 and identified as the quaternary text zone is thus text zone 1. The quaternary text zone 1 is placed at the end of the processing sequence and immediately after the tertiary text zones 5 to 9. Likewise, in FIG. 4, the highest-ranked of the primary text zones is primary text zone 1, such that there are no text zone ranked above below primary text zone 1 and thus no quaternary text zone in this example.

In summary, for the text zone arrangement and the region of interest 28 of the image 20 illustrated in FIG. 3C, the text zones 1 to 9 can be ordered according to the following OCR processing sequence: 2, 3, 4, 5, 6, 7, 8, 9 and 1. Likewise, for the text zone arrangement and the region of interest 28 of the image 20 illustrated in FIG. 4, the text zones 1 to 14 can be ordered according to the following OCR processing sequence: 1, 2, 9, 10, 11, 3, 4, 5, 6, 7, 8, 12, 13 and 14.

Second Example of Priority Rules for Determining the OCR Processing Sequence

Figure 10:
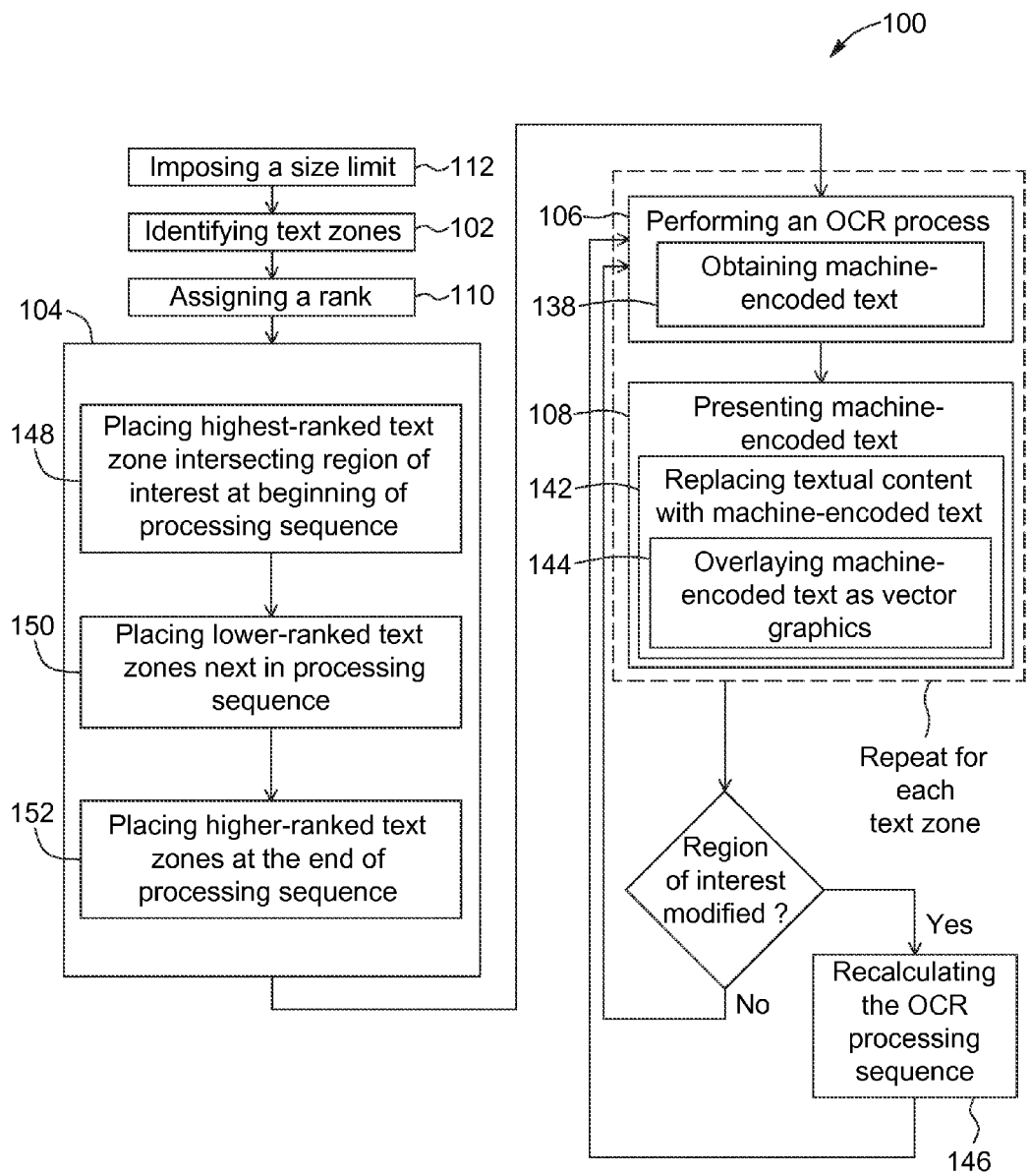
FIG. 10 is a flow diagram of a method for providing a text-based representation of a region of interest of an image to a user, in accordance with another exemplary embodiment.

As mentioned above, the set of priority rules described above is provided for illustrative purposes only, such that in other embodiments, the processing sequence can be established according to different sets of priority rules. In a second example, and with reference to FIG. 10, the step 104 of determining the processing sequence can include a substep 148 of placing a highest-ranked text zone intersecting the region of the beginning of the processing sequence. This highest-ranked text zone intersecting the region of interest is thus treated in a prioritized manner compared to the other text zones.

In FIG. 3C, the text zones intersecting the region of interest 28 are text zones 2, 3 and 4. The highest-ranked text zone among these three text zones is text zone 2, which is thus placed at the beginning of the processing sequence. Similarly, in FIG. 4, the text zones intersecting the region of interest 28 are text zones 1, 2, 9, 10 and 11. The highest-ranked of these five text zones is text zone 1, which is thus placed at the beginning of the processing sequence.

Referring back to FIG. 10, the step 104 of determining the processing sequence can also include a substep 150 of placing, immediately after the highest-ranked text zone intersecting the region of interest, any text zone that is ranked below this highest-ranked text zone. If more than one such text zone is identified, they are ordered in the processing sequence according to their ranking.

For example, in FIG. 3C, the text zones that are ranked below the highest-ranked text zone intersecting the region of interest 28, that is, text zone 2, are text zones 3 to 9. These text zones are thus placed immediately after text zone 2 in the processing sequence and are ordered according to their ranking: text zone 3, followed by text zone 4, and so on through text zone 9. In FIG. 4, the text zones that are ranked below the highest-ranked text zone intersecting the region of interest 28, that is, text zone 1, are text zones 2 to 14. These text zones are thus placed immediately after text zone 1 in the processing sequence and are ordered according to their ranking: text zone 2, followed by text zone 3, and so on through text zone 14.

Referring back to FIG. 10, the step 104 of determining the processing sequence can also include a substep 152 of placing, at the end of the processing sequence, any text zone that is ranked above the highest-ranked text zone intersecting the region of interest. If more than one such text zone is identified, they are ordered at the end of the processing sequence according to their ranking.

For example, in FIG. 3C, only text zone 1 is ranked above the highest-ranked text zone intersecting the region of interest 28, that is, text zone 2. Text zone 1 is thus placed at the end of the processing sequence. In FIG. 4, no text zone is ranked above the highest-ranked text zone intersecting the region of interest 28 since this highest-ranked text zone corresponds to text zone 1.

In summary, according to the second exemplary set of priority rules, the text zones in FIG. 3C can be ordered according to the following processing sequence: 2, 3, 4, 5, 6, 7, 8, 9 and 1. In FIG. 4, the second exemplary set of priority rules leads to the following processing sequence: 1, 2, 3, 4, 5, 6, 7, 8, 9, 10, 11, 12, 13 and 14.

OCR Process and Presentation of the Text-based Representation

Referring back to FIGS. 1 and 2, the method 100 further includes performing 106 an OCR process on the text zones according to the processing sequence to progressively obtain a machine-encoded representation of the region of interest of the image. In particular, the step 106 of performing the OCR process on the text zones can include a substep 138 of obtaining machine-encoded text corresponding to the textual content of each text zone. In such a case, it will be understood that the machine-encoded representation of the region of interest is made up of at least part of the machine-encoded text of each of the text zones intersecting the region of interest.

As mentioned above, the processing sequence is established so that the region of interest of the image is processed in a prioritized manner. As used herein, the term "prioritized manner" is meant to indicate that OCR is performed on the textual content of at least one text zone intersecting the region of interest before the textual content of other text zones, in order to prioritize OCR processing on the region of interest of the image presented to the user. For example, in some embodiments, only one text zone intersects the region of interest such that OCR is to be performed on this single text zone in a prioritized manner. In other embodiments, the region of interest is intersected by more than one text zone. In such cases, one or more of these text zones may be given priority. For example, each one of the text zones intersecting the region of interest may be treated in a prioritized manner (see, e.g., FIG. 1). Alternatively, priority may be given to only one of the text zones intersecting the region of interest, for example the highest-ranked of the text zones intersecting the region of interest (see, e.g., FIG. 10).

In some embodiments, not only is the OCR processing of one or more of the text zones intersecting the region of interest performed before, but it is also performed more rapidly, more accurately and/or with more dedicated processing resources than the OCR processing of the remainder of the text zones. In this manner, the machine-encoded representation of the region of interest 26 can be presented to the user as quickly as possible, thus easing reading of the textual content of the image by the user.

The OCR process may be embodied by any appropriate optical character recognition technique or algorithm, or combination thereof, capable of extracting textual content from an input image and outputting the same as a machine-encoded representation, for example in an ASCII or Unicode format. For example, the OCR process may be performed by the FireWorX (trademark) or the 2-Way Voting (trademark) OCR engine from the company Nuance, or by another similar OCR engine or software. It will be understood that depending on the requirements of a particular embodiment, the OCR process may provide different speed and accuracy levels without departing from the scope of the present invention.

As the machine-encoded representation of the region of interest is progressively obtained, the machine-encoded representation is also concurrently presented 108 to the user, via an output device, as the text-based representation of the region of interest. The machine-encoded representation of the region of interest may be presented to a user as the text-based representation according to various formats. In one embodiment, the machine-encoded representation of the region of interest may be displayed to a user as suitably magnified text, so that the output device is a visual display unit, such as for example a monitor, providing a visual representation of the machine-encoded representation as the text-based representation, as shown in FIG. 7. For example, referring to FIG. 2, presenting 108 the machine-encoded representation of the region of interest 28 can include rendering 140 textual content 22 within the region of interest 28 as vector graphics.

By the term "concurrently", it is meant that as OCR is performed on the text zones to progressively obtain the machine-encoded representation of the region of interest, the machine-encoded representation is at the same time progressively presented to the user as the text-based representation. For example, in scenarios where the text-based representation is an audio or Braille output, the machine-encoded representation can be presented to the user as smoothly and consistently as possible to provide a satisfactory user experience. In scenarios where the text-based representation is visually displayed to the user (e.g., as suitably magnified text), the text-based representation presented to the user can be updated or refreshed every time the textual content of an additional one of text zones is recognized and added to the machine-encoded representation of the region of interest.

Referring back to FIG. 1, the step 108 of presenting the machine-encoded representation of the region of interest to the user can include a substep 142 of replacing, in the image, the textual content of each text zone with the corresponding machine-encoded text. Throughout the drawings, each line of machine-encoded text 30 is schematically represented by a thin elongated rectangular strip with uniformly cross-hatched interior (see, e.g., FIG. 3D). In this regard, it will be recognized that the replacement of the textual content 22 of every text zone 1 to 9 with its corresponding machine-encoded text 30 can be performed (see, e.g., FIG. 3H), even though only the machine-encoded text making up the machine-encoded representation 32 of the current region of interest 28 may be presented to the user as the text-based representation 34 (see, e.g., FIGS. 5 and 6).

The replacement of the textual content of each text zone with the corresponding machine-encoded text can be performed according to the processing sequence. In particular, the replacement can be performed, for each text zone, before obtaining the machine-encoded text of the following text zone in the processing sequence, in order to present the machine-encoded representation of the region of interest of the image as quickly as possible. For example, the machine-encoded text 30 of primary text zone 2 is displayed on the image 20 (see FIG. 3D) before commencing the OCR process on primary text zone 3 (see FIG. 3E). In this regard, and as mentioned above, for each text zone, the textual content can be presented to the user only once the entire text zone has been processed.

Figure 3E:
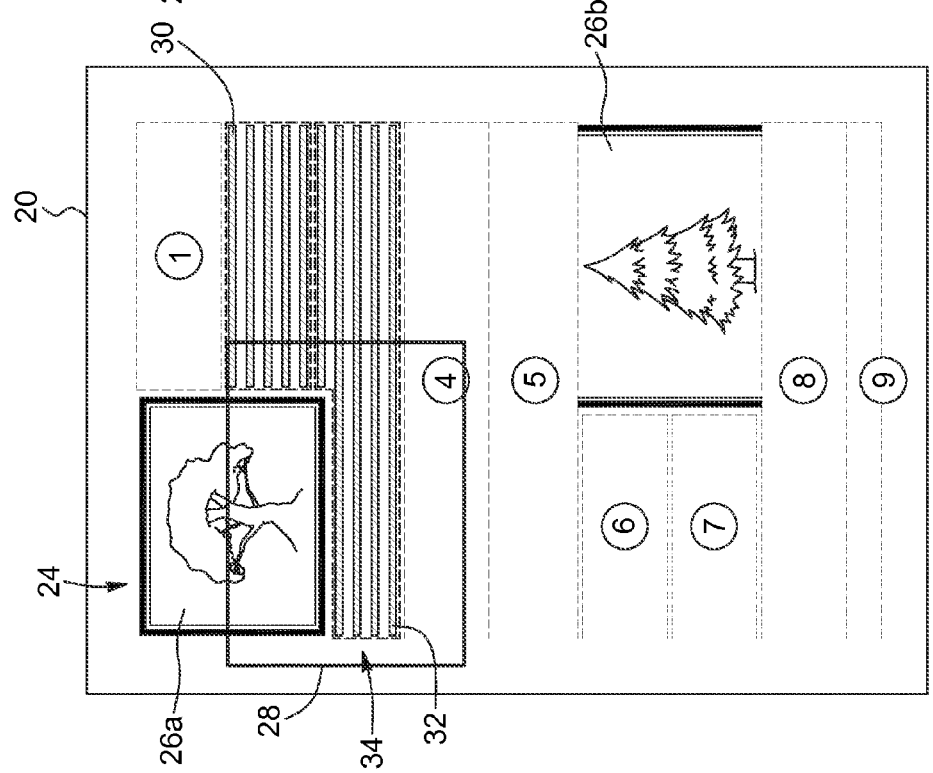
Figure 5:
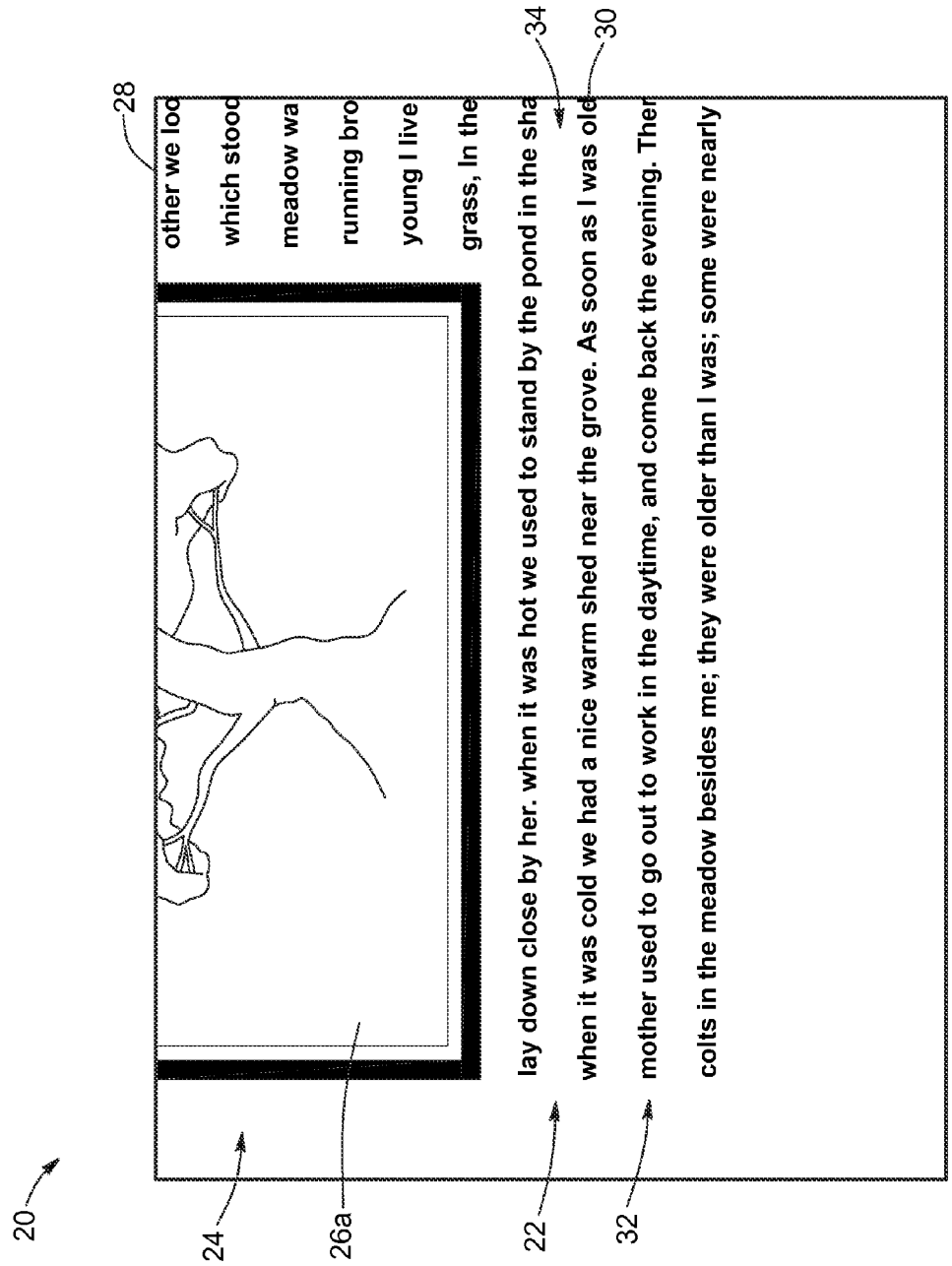
FIG. 5 is a view of the text-based representation of the region of interest of the image that is presented to a user after the processing step of FIG. 3E is completed, in accordance with an exemplary embodiment.
Figure 6:
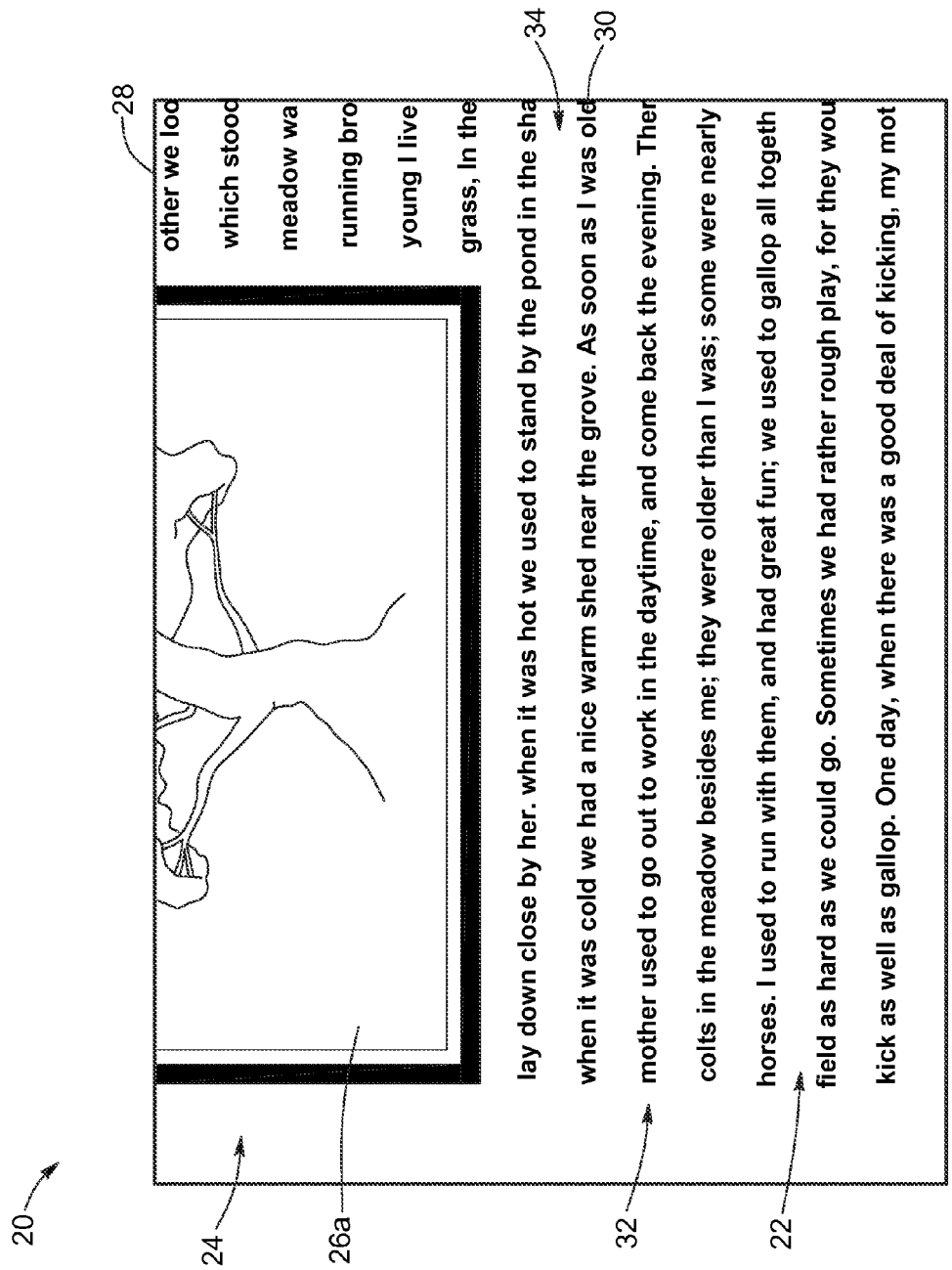
FIG. 6 is a view of the text-based representation of the region of interest of the image that is presented to a user after the processing step of FIG. 3H is completed, in accordance with an exemplary embodiment.

FIG. 5 shows an example of a text-based representation 34 that could be presented to the user while the OCR process is performed, for example at the stage presented in FIG. 3E after primary text zones 2 and 3 have been processed but before the processing of primary text zone 4. In this example, the textual content of primary text zones 2 and 3, which is encompassed in the region of interest 28, is presented to the user as vector graphics. The region where the text of primary text zone 4 would normally appear may be left empty while the OCR process is still running on that text zone. Referring to FIG. 6, there is shown the text-based representation 34 of the same region of interest 26 as in FIG. 5 once the OCR process has been completed for the entire image 20, as in FIG. 3H. By comparison to FIG. 5, it can be seen that in FIG. 6 all the textual information is now available.

In one exemplary embodiment, the presentation 108 of the machine-encoded text can be done according to the following sequence:

1. The entire bitmap of the image is erased and replaced by a background bitmap having a single and uniform color. This color may be system-defined or selected by the user, and may for example take under consideration optimized parameters for a low-vision condition of the user, user preferences or both.
2. Non-textual content, such as the first and second pictures 26a, 26b in FIG. 3A, is redrawn on the background bitmap.
3. As the OCR process is performed on the text zones according to the processing sequence, lines of text of each text zone are displayed one line at a time as vector graphics over the background bitmap. Each line of text is preferably displayed in a single and uniform text color. As with the background color, the text color may be system-defined or selected by the user, and may for example take under consideration optimized parameters for a low-vision condition of the user, user preferences or both.

One of ordinary skill in the art will appreciate that depending on the eye condition of a user and other factors, certain text and background color combinations may improve the ease of reading. The overlay of the machine-encoded text described above can allow for the user to read text using an optimal text and background color combination. It is to be noted that this optimal text and background color combination can be displayed independently of the text color or the background color of the original bitmap.

Referring back to FIG. 1, in another embodiment, the replacement 142 of the textual content of each text zone in the image with the corresponding machine-encoded text can include a substep 144 of overlaying, as vector graphics, the machine-encoded text of each text zone on the corresponding textual content in bitmap format. For example, FIG. 3H illustrates the resulting image once the textual content 22 of every text zone 1 to 9 has been replaced with the corresponding machine-encoded text 30. It can be seen that the original bitmap-formatted textual content 22 contained in the image 20 has been replaced by vector graphics generated by the OCR process. However, non-textual content 24 such as the first and second pictures 26a, 26b can still be presented in their original bitmap format. It will be understood that, in some embodiments, the user may be able to toggle between the text-based representation and the bitmap textual content of the image 20 at any time during the steps of obtaining machine-encoded text for each text zone and replacing 142 the textual content of each text zone with machine-encoded text. This may be desirable if, for example, the text-based representation 24 contains too many OCR mistakes or omissions.

Advantageously, the method according to embodiments of the invention allows that once the entire bitmap textual content contained in the image has been replaced by vector graphics, the text-based representation of any region of interest of the image becomes resolution-independent and can thus be readily represented at any desired resolution.

Alternatively or additionally, the text-based representation of the region of interest can be read aloud as synthesized speech or be output as tactile Braille content. In such a case, the output device can be an audio display device or a Braille display device, respectively presenting the machine-encoded representation of the region of interest as an audio output (e.g., synthesized speech) or a Braille output (e.g., tactile Braille characters).

Modification of the Region of Interest

In some instances, a user may wish to change the size or position of the region of interest while the OCR process is being performed on the text zones. FIGS. 3F and 3G illustrate the effect of modifying the position of the region of interest 28 while the step of obtaining machine-encoded text corresponding to the textual content of primary text zone 3 (see FIG. 3E) is being performed. It will be understood that, in practice, the modification of the region of interest may take at certain time (e.g., a few seconds) to be completed if, for example, the user pans the region of interest 28 from the top to the bottom of the image 20.

Referring to FIG. 3F, upon a change in at least one of a size and a position of the region of interest, the method 100 includes a step 146 of recalculating the processing sequence of unprocessed ones of the text zones. The recalculation is based, firstly and prioritarily, on the arrangement of the unprocessed ones of the text zones with respect to the region of interest after the change and, secondly, on the ranks of the unprocessed ones of the text zones. It is noted, as mentioned above, that while the number and identity of the text zones intersecting the region of interest will generally be modified upon a change in the region of interest, the rank assigned to each text zone (e.g., 1 to 9 in FIG. 3C and 1 to 14 in FIG. 4) will remain unaffected by such a change. If the region of interest is modified while the OCR process is performed on a given text zone (e.g., primary text zone 3 in FIG. 3F), the OCR process may be completed on this text zone before recalculating the processing sequence.

Referring to FIG. 3F, it is seen that the new region of interest 28 now intersects text zones 6, 7 and 8. Accordingly, applying the first exemplary set of priority rules introduced above, the text zones 6, 7 and 8 will now be identified as new primary text zones and will be placed, according to their rank, at the beginning of the updated processing sequence: primary text zone 6, followed by primary text zone 7, and followed by primary text zone 8.

In FIG. 4, text zones 6 and 8 are the highest-ranked and lowest-ranked of the new primary text zones. As the only text zone ranked between them is new primary text zone 7, there is still no secondary text zone among the text zones 1 to 9. Moreover, the unprocessed text zone ranked below primary text zone 8 is text zone 9, which is identified as the new tertiary text zone and placed in the updated processing sequence immediately after the new primary text zones 6, 7, and 8. Finally, the unprocessed text zones ranked above primary text zone 6 are text zones 1, 4 and 5, which are identified as the new quaternary text zones. Text zones 1, 4 and 5 are placed at the end of the processing sequence according to their rank: quaternary text zone 1, followed by quaternary text zone 4, and followed by quaternary text zone 5.

In summary, upon the change in the position of the region of interest between FIG. 3E and FIG. 3F, the processing sequence of the text zones left to be processed can be changed from "4, 5, 6, 7, 8, 9 and 1" to "6, 7, 8, 9, 1, 4 and 5". Referring to FIG. 3G, following the modification of the region of interest 26, the steps of obtaining 138 machine-encoded text for each text zone and replacing 142 the textual content of each text zone with machine-encoded text is performed on the text zones 6, 7 and 8 in a prioritized manner, as text zones 6, 7 and 8 have become primary text zones intersecting the region of interest 28.

Computer Readable Memory

According to another aspect of the invention, there is provided a computer readable memory storing computer executable instructions thereon that when executed by a computer can perform the OCR methods described herein.

As used herein, the term "computer readable memory" is intended to refer to a non-transitory and tangible computer product that can store and communicate executable instructions for the implementation of the OCR methods described herein. The computer readable memory can be any computer data storage device or assembly of such devices including, for example: a temporary storage unit such as a random-access memory (RAM) or dynamic RAM; a permanent storage such as a hard disk; an optical storage device, such as a CD or DVD (rewritable or write once/read only); a flash memory; and/or other non-transitory memory technologies. A plurality of such storage devices may be provided, as can be understood by one of ordinary skill in the art.

According to embodiments of the present invention, the computer readable memory may be associated with, coupled to or included in a processing unit configured to execute instructions stored in the computer readable medium in connection with various functions associated with the processing unit (see, e.g., FIG. 7 illustrating a schematic functional block diagram of a system capable of performing the methods described herein and provided with a processing unit 208 provided with a computer readable memory 234). As used herein, the term "processing unit" refers to an electronic circuitry that controls and executes, at least partially, computer instructions required to perform the OCR methods described herein.

The processing unit can be embodied by a central processing unit (CPU), a microprocessor, a microcontroller, a processing core, a system on a chip (SoC), a digital signal processor (DSP), a programmable logic device, or by any other processing resource or any combination of such processing resources configured to operate collectively as a processing unit. A plurality of such processors may be provided, according to embodiments of the present invention, as can be understood by one of ordinary skill in the art. The processor may be provided within one or more general purpose computers, for example, and/or any other suitable computing devices.

Figure 9:
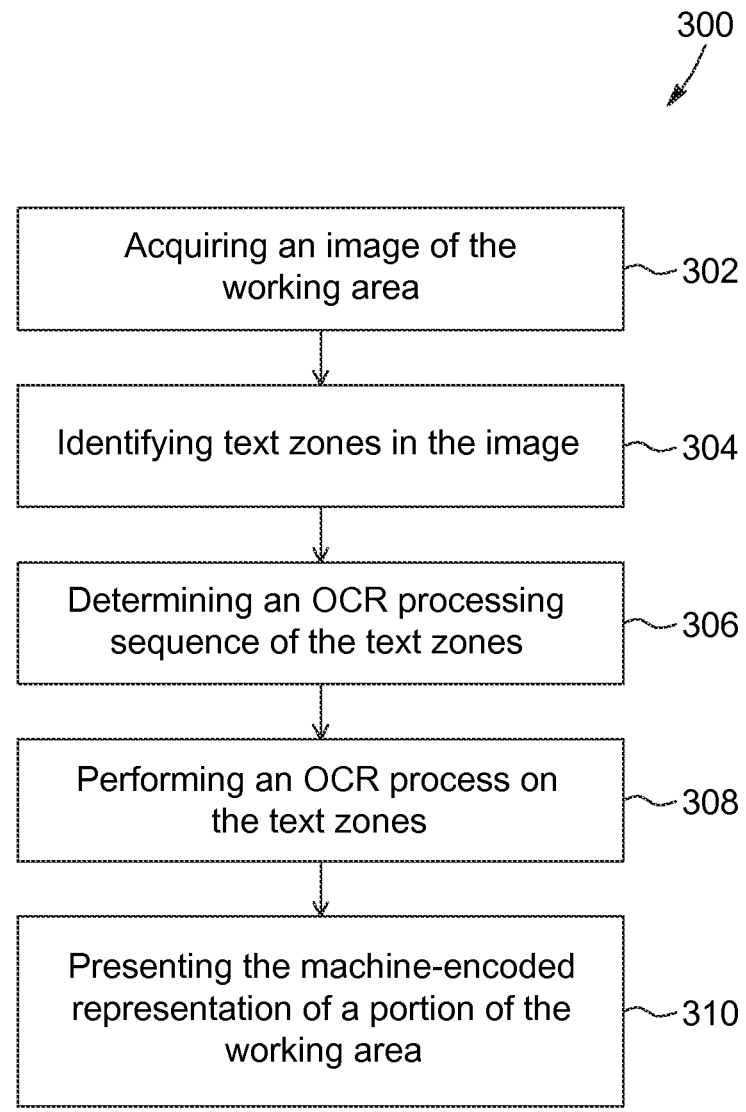
FIG. 9 is a flow diagram of a method for providing a text-based representation of a portion of a working area to a user, in accordance with an exemplary embodiment.

Method for Providing a Text-based Representation of a Portion of a Working Area to a User In accordance with another aspect of the invention, and with particular reference to FIG. 9, there is provided a method 100 for providing a text-based representation of a portion of a working area to a user. FIG. 9 illustrate a flow diagram of an exemplary embodiment of the method 300 which, by way of example, can be performed with a system 200 like that shown in FIG. 7 or another system or device.

As used herein, the term "working area" is meant to encompass any physical structure or region having textual content thereon, or on which is disposed an object or objects having textual content thereon, wherein the textual content is to be extracted using OCR and presented to a user as a text-based representation. Typical objects may include, without being limited to, documents, books, newspapers, magazines, bills, checks, and three-dimensional objects such as pill bottles, labeled products or packages, and the like. In some embodiments, the working area may be a generally flat surface on which may be placed an object, for example a document containing printed, typewritten or handwritten text. Preferably, the working area has dimensions suitable to receive typical objects of which a user may wish to obtain a text-based representation in their entirety. One of ordinary skill in the art will understand that the terms "working area" and "object" are not intended to be restrictive.

As will be understood from the following description, the method 300 illustrated in FIG. 9 share several steps with the method 100 illustrated in FIGS. 1 and 2, in particular the identification 102, determination 104, OCR processing 106, presentation 108 and recalculation 146 steps of the method 100. Accordingly, the description of these steps and of any features or variants thereof that were detailed above in relation to the method 100 illustrated in FIGS. 1 and 2 will not be repeated in detail hereinbelow.

The method 300 first includes a step 302 of acquiring an image of the entire working area (see, e.g., the working area 204 in FIG. 7). The image can be a bitmap image stored as an array of pixels, where each pixel includes color and brightness information corresponding to a particular location in the image. For example, in FIGS. 3A to 3H, the bitmap image 20 corresponds to the image of a document, which corresponds to the document 220 shown in FIG. 7. Of course, in other embodiments the image need not be the image of a document. In particular, the image may be embodied by any image with textual content which can be recognized and translated into machine-encoded text using OCR.

In the exemplary embodiment of FIG. 3A, the image 20 includes both textual content 22 and non-textual content 24. The textual content 22 can include, without limitation, printed, typewritten, handwritten and embossed text. Throughout the drawings, each line of textual content in bitmap format is schematically represented by a thin elongated rectangular strip with unhatched interior (see FIG. 3A). The non-textual content 24 can include, for example, pictures, tables, line graphics, and the like. By way of example, the non-textual content 24 in the image 20 of FIGS. 3A to 3H includes a first picture 26a and a second picture 26b.

At the start of the method 300 of FIG. 9, the image acquisition step 302 can be triggered by instructions received from the user, or automatically, for example when an absence of movement or another capture trigger parameter is detected for a predetermined period of time. It will be understood that the image can be acquired using any appropriate optical imaging device or combination of devices apt to detect emitted or reflected optical radiation and to use the detected optical radiation to generate the image. For example, in FIG. 7, the working area 204 is a rectangular surface disposed so as to be entirely contained within the field of view 222 of the image sensor 206 of the camera unit 202.

It will also be appreciated that acquiring the image of the entire working area at a high-resolution image can allow a user to zoom in on and to have displayed, on a given display device, a specific area of interest of the image by zooming and panning over the array of pixels making up the image. Accordingly, embodiments of the invention can spare a user from having to rely on optical zooming and from having to physically move the working area relative to the field of view of the image sensor in order to display a specific region of interest 26 of the image 20 to a user without suffering from a perceived loss of resolution (see, e.g., FIG. 3A). In the context of the method 300 shown in FIG. 9, the term "region of interest" refers more particularly to the part of the image of the working area corresponding to the portion of the working area whose text-based representation is to be provided to a user by performing the method 300.

The method also includes a step 304 of identifying text zones within the image. Each text zone includes textual content and has a respective rank assigned thereto, which is different for each text zone and is based on an arrangement of the text zones within the image. As mentioned above with regards to the method illustrated in FIGS. 1 and 2, the ranks of the text zones are assigned without having regard to the position and size of the region of interest within the image or to the arrangement of the text zones with respect to the region of interest. Accordingly, the rank of each text zone remains unaffected by a change in position and/or in size of the region of interest. In some embodiments, the rules according to which the text zones are ranked can be based on the order in which the textual content of the image would normally or logically be read by a user, but other sets of rules for ranking the text zones can be used.

The method shown in FIG. 9 further includes a step 306 of determining a processing sequence for performing OCR on the text zones. The processing sequence is based, firstly, on an arrangement of the text zones with respect to the region of interest of the image corresponding to the portion of the working area and, secondly, on the ranks assigned to the text zones. In particular, the processing sequence can be determined so that one or more text zones intersecting the region of interest are placed earlier (i.e., ahead) in the processing sequence than any other text zone. As a result, depending on the position and size of the region of interest within the image, the rank according to which the text zones are placed in the processing sequence can either differ from or coincide with the ranks assigned to the text zones based on the their arrangement within the image. The determination 306 of the processing sequence can be based on the two exemplary sets of priority rules described above with reference to FIGS. 1 and 3A to 3H or on a different set of priority rules.

The method 300 shown in FIG. 9 further includes a step 308 of performing an OCR process on the text zones according to the processing sequence, thereby obtaining a machine-encoded representation of the portion of the working area. In particular, the step 308 of performing the OCR process on the text zones can include a substep of obtaining machine-encoded text corresponding to the textual content of each text zone. In such a case, it will be understood that the machine-encoded representation of the portion of the working area corresponding to the region of interest of the image is made up of at least part of the machine-encoded text of each of the text zones intersecting the region of interest.

As mentioned above, the processing sequence is established so that the region of interest of the image, or at least a portion thereof, is processed in a prioritized manner, which ensures that at least part of the machine-encoded representation of the portion of the working area corresponding to the region of interest of the image is presented to the user as quickly as possible. As also mentioned above, the OCR process may be embodied by any appropriate optical character recognition technique or algorithm, or combination thereof, capable of extracting textual content from an input image and outputting the same as a machine-encoded representation.

As the machine-encoded representation of the region of interest is progressively obtained, the machine-encoded representation is also concurrently presented 310 to the user. The machine-encoded representation of the portion of the working area may be presented to a user as the text-based representation according to various formats, including a visual representation, an audio representation, and a Braille representation.

Figure 8:
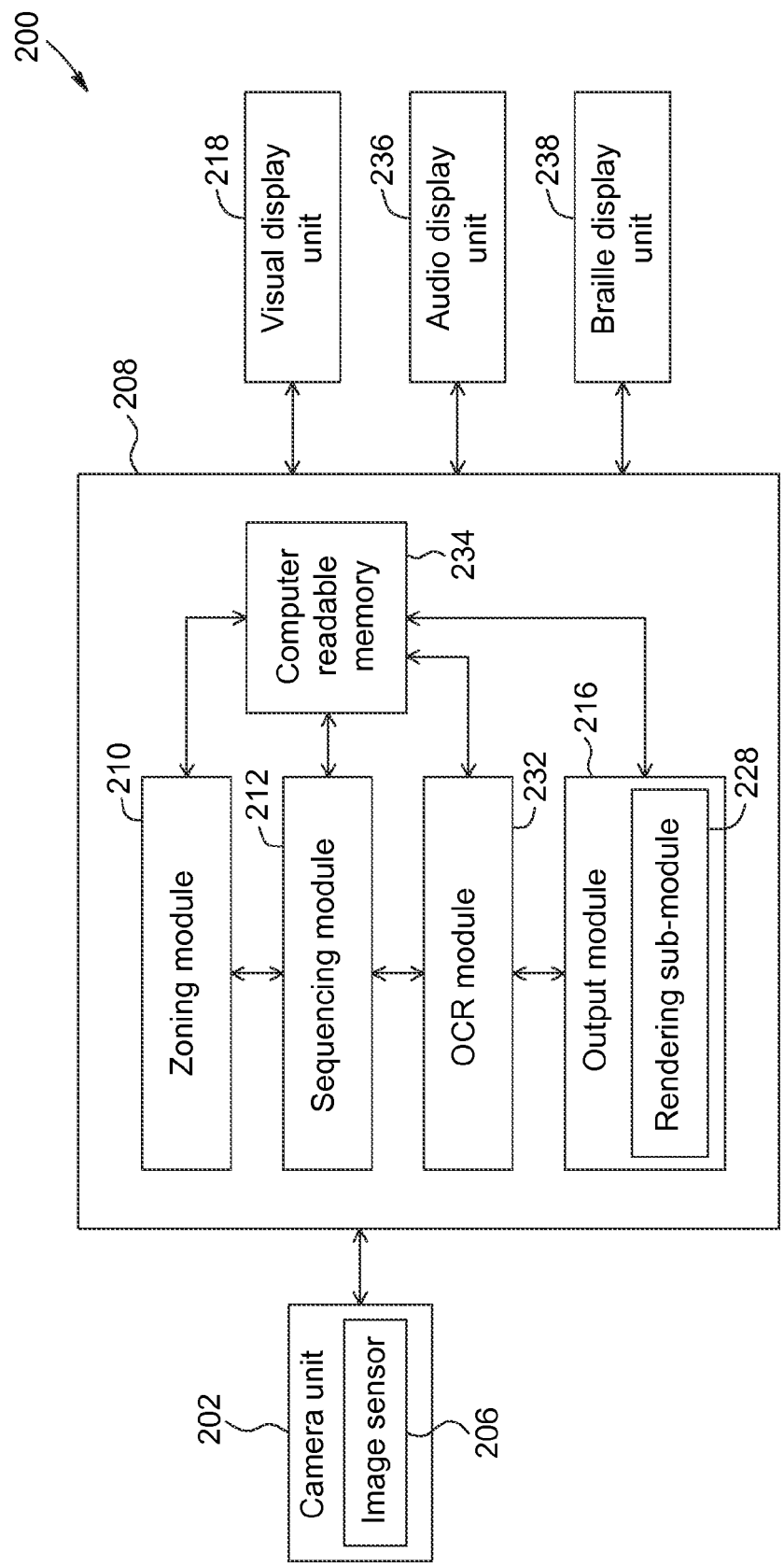
FIG. 8 is a schematic functional block diagram of a system for providing a text-based representation of a portion of a working area to a user, in accordance with an exemplary embodiment.

System for Providing a Text-based Representation of a Portion of a Working Area to a User In accordance with another aspect of the invention, there is provided a system for providing a text-based representation of a portion of a working area to a user. FIGS. 7 and 8 illustrate respectively a schematic perspective view and a schematic functional block diagram of an embodiment of the system 200. It will be understood that the system 200 can be used to perform the methods described above with reference to FIGS. 1, 2 and 9.

Broadly described, the system 200 includes a camera unit 202 disposed over a working area 204 and having an image sensor 206 acquiring an image (see, e.g., the image 20 in FIG. 3A) of the entire working area 204, and a processing unit 208 receiving the image from the camera unit 202. The processing unit 208 includes a plurality of modules and sub-modules, which will be described in greater detail below, including a zoning module 210, a sequencing module 212, an OCR module 232, and an output module 216. The system 200 may optionally include a visual display unit 218 for displaying to a user the text-based representation 24 output by the output module 216.

As mentioned above, it is noted that the system of FIG. 7 is provided for illustrative purposes only and that embodiments of the present invention can be performed with or embodied by any system or device capable of performing the OCR processes described herein. In particular, while in some embodiments of the invention the system may be suitable for or targeted to low-vision individuals, one of ordinary skill in the art will understand that embodiments of the invention could, in general, be used by any person desiring that textual content from an image be extracted using OCR and presented to him or her in a fast, efficient, and logical manner.

Camera Unit

In the exemplary embodiment of FIG. 7, the camera unit 202 is mounted on a frame structure 224 of the system 200 and has a field of view 222 encompassing the working area 204. The working area 204 is typically a flat surface on which a user may place an object to be magnified or otherwise viewed on the visual display unit 218. For example, the object may be a document 220 the user wishes to read. It will be understood that in the embodiment of FIG. 7, the system is intended to be used as a stand-alone device such that the camera unit 202 is incorporated into the frame structure 224 as an integral component of the system 200. However, in other embodiments, the camera unit 202 may be provided in a handheld device, which can be mounted on and docked to the frame structure 224 of the system 200, such that images of the working area 204 may be acquired by the camera unit 202 of the handheld device and be displayed on the visual display unit 218.

As used herein, the "camera unit" refers to any component or combination of components capable of acquiring an image of a scene, such as the working area 204 of the system 200 of FIG. 7. More particularly, the term "camera unit" is meant to encompass the imaging elements (e.g., image sensor and imaging optics) and the camera circuitry associated therewith which are collectively used to acquire such an image. In some embodiments, the camera unit 202 is preferably a high-resolution digital camera, although lower resolution cameras or non-digital devices may be used without departing from the scope of the present invention.

The term "image sensor" as used herein refers to any photosensitive device able to detect optical radiation emitted or reflected by an object and use it to generate an image of the object based on the detected optical radiation. More particularly, an image sensor may be composed of a linear or two-dimensional array of light-sensitive elements (i.e., pixels), the number and arrangement of which defines the resolution of the camera. The image sensor 206 may have a resolution of at least 2 megapixels. For example, in one embodiment, the image sensor 206 may have a resolution of 8 megapixels in RGBA format at 32 bits per pixel, corresponding, for example, to an array size of 3264×2448 pixels. However, it is to be understood that embodiments of the system 200 are not limited by the resolution of the image sensor 206 of the camera unit 202 and that numerous resolution values are understood to be encompassed within the scope of the present invention. It will be understood that the image sensor 206 is adapted to receive optical radiation from the working area 204 or from a document 220 placed thereon, and to convert the received optical radiation into electrical data representing an image of the object. The image sensor 206 is preferably embodied by complementary metal-oxide-semiconductor (CMOS) or charge-coupled device (CCD) pixel sensors, but other types of image sensors (e.g., charge injection devices or photo diode arrays) could be used without departing from the scope of the present invention.

Referring back to FIGS. 7 and 8, the camera unit 202 has a field of view 222 directed and extending toward the working area 204. As used herein, the term "field of view" generally refers to the solid angular extent of a given scene that is imaged by a camera. In general, the shape of the field of view of the camera unit 202 as a whole is defined or limited by the shape of the image sensor 206. In the embodiment of FIG. 7 the field of view 222 is rectangular but other shapes are possible in other embodiments. Moreover, it may be advantageous that the field of view 222 of the camera unit 202 be sufficiently wide to permit the system 200 to acquire an image of the entire surface of a document 220 having a typical letter size disposed on the working area 204.

Processing Unit

The system 200 also includes a processing unit 208 receiving the image from the camera unit 202. As mentioned above, the processing unit 208 is an electronic circuitry that controls and executes, at least partially, computer executable instructions to provide the text-based representation of the portion 214 of the working area 204 to a user. The computer executable instruction can be stored on a computer readable memory 234 including, for example: a temporary storage unit such as a RAM or dynamic RAM; a permanent storage such as a hard disk; an optical storage device, such as a CD or DVD (rewritable or write once/read only); a flash memory; and/or other non-transitory memory technologies. A plurality of such storage devices may be provided, as can be understood by one of ordinary skill in the art. The computer executable instructions stored on the computer readable memory element preferably configure the processing unit 208 computing device to provide the functionalities as discussed below with respect to the system 200.

As illustrated in FIG. 8, the processing unit 208 is preferably connected to various elements of the system 200 such as the camera unit 202 and the visual display unit 218 via various input/output (I/O) communication ports, such as camera ports and display ports. The processing unit 208 may be implemented as a single unit or as a plurality of interconnected processing sub-units. The processing unit 208 can be embodied by a CPU, a microprocessor, a microcontroller, a processing core, a SoC, a DSP, a programmable logic device, or by any other processing resource or any combination of such processing resources configured to operate collectively as a processing unit. In particular, this terminology should not be construed so as to limit the scope or application of the invention.

The processing unit will be described below as a series of various modules, each associated with one or more different functions. It will be readily understood by one of ordinary skill in the art that, in practice, each module may include a plurality of sub-modules, routines, components, communication ports, software and the like cooperating together in order to accomplish the corresponding function. It will be further understood that the subdivision into such modules is made from a conceptual standpoint only and that, in practice, a given hardware or software component may be shared by different modules, and that components of different modules may be combined together physically and logically without departing from the scope of the present invention. Preferably, the various physical components of the processing unit and the interconnections therebetween are disposed on an integrated circuit (IC) die, which is preferably mounted onto a printed circuit board (PCB).

Referring to FIG. 8, the processing unit 208 includes a zoning module 210 identifying text zones within the image (see, e.g., text zones 1 to 9 of image 20 in FIG. 3C). Each text zone includes textual content and has a respective rank assigned thereto based on an arrangement of the text zones within the image. The zoning module 210 assigns the ranks of the text zones without having regard to the position and size of the region of interest within the image or to the arrangement of the text zones with respect to the region of interest. Accordingly, the rank of each text zone remains unaffected by a change in position and/or in size of the region of interest. The zoning module 210 can rank the text zones based on the order in which the textual content of the image would normally or logically be read by a user, but other sets of rules can be used.

The processing unit 208 also includes a sequencing module 212 determining a processing sequence for performing OCR on the text zones. The sequencing module 212 determines the processing sequence based, firstly, on an arrangement of the text zones with respect to the region of interest of the image corresponding to the portion 214 of the working area 204 (see, e.g., the region of interest 28 in FIG. 3C) and, secondly, on the ranks assigned to the text zones by the zoning module 210. The sequencing module 212 can determine the processing sequence based on the two exemplary sets of priority rules described above with reference to FIGS. 1 and 3A to 3H or on a different set of priority rules.

The processing unit 208 further includes an OCR module 232 performing an OCR process on the text zones according to the processing sequence, thereby obtaining a machine-encoded representation of the portion 214 of the working area 204. In some embodiments, the OCR module 232 can obtain machine-encoded text corresponding to the textual content of each text zone. In such a case, it will be understood that the machine-encoded representation of the portion 214 of the working area 204 obtained by the OCR module 232 and corresponding to the region of interest of the image is made up of at least part of the machine-encoded text of each of the text zones intersecting the region of interest.

The processing unit 208 also includes an output module 216 immediately outputting, as the text-based representation, the machine-encoded representation of the portion 214 of the working area 204 (see, e.g., FIGS. 3D, 5 and 6). The machine-encoded representation of the portion 214 of the working area 204 can be presented to the according to various formats, including a visual representation, an audio representation, and a Braille representation. In some embodiments, the output module 216 may further include a rendering sub-module 228 for rendering text content within the region of interest as vector graphics.

In one embodiment the output module 216 can execute the following sequence:

1. The entire bitmap of the image is erased and replaced by a background bitmap having a single and uniform color. This color may be system-defined or selected by the user, and may for example take under consideration optimized parameters for a low-vision condition of the user, user preferences or both.
2. Non-textual content is redrawn on the background bitmap (see, e.g., the first and second pictures 26a, 26b in FIG. 3A).
3. As the OCR module 232 performs the OCR process on the text zones according to the processing sequence, lines of text of each text zone are displayed one line at a time as vector graphics over the background bitmap. Each line of text is preferably displayed in a single and uniform text color. As with the background color, the text color may be system-defined or selected by the user, and may for example take under consideration optimized parameters for a low-vision condition of the user, user preferences or both.

As mentioned above, one of ordinary skill in the art will appreciate that depending on the eye condition of a user and other factors, certain text and background color combinations may improve the ease of reading. The overlay of the machine-encoded text described above can allow for the user to read text using an optimal text and background color combination. It is to be noted that this optimal text and background color combination can be displayed independently of the text color or the background color of the original bitmap.

Alternatively, the output module 216 can be configured to dimply overlay, as vector graphics, the machine-encoded text of each text zone on the corresponding textual content in bitmap format.

The system 200 may optionally include a visual display unit 218 receiving the text-based representation 24 output by the output module 216 and presenting the same to the user. In the embodiment of FIG. 7, the visual display unit 218 is preferably mounted on a display support 230 of the frame structure 224. However, the system 200 may have a different configuration than the one shown in the FIG. 7, such that other embodiments the visual display unit 218 may be provided a stand-alone unit not physically connected to the frame structure 224. The visual display unit 218 may be embodied by any type of display technology, such as liquid crystal display (LCD), light-emitting diode (LED), organic LED (OLED), plasma display panel (PDP), light-emitting polymer display (LPD) or active-matrix OLED (AMOLED) technology. For example, in one embodiment, the visual display unit 218 uses LCD display technology with LED backlight.

Alternatively or additionally, the text-based representation of the portion 214 of the working area 204 can be read aloud as synthesized speech or be output as tactile Braille content. In such a case, referring to FIG. 8, the system 200 may include an audio display unit 236 (e.g. a speaker) or a Braille display unit 238, respectively presenting the machine-encoded representation of the region of interest as an audio output (e.g., synthesized speech) or a Braille output (e.g., tactile Braille characters).

Of course, numerous modifications could be made to the embodiments described above without departing from the scope of the present invention.

The invention claimed is:

1. A computer-implemented method for providing a text-based representation of a region of interest of an image to a user, the method comprising the steps of:
    identifying text zones within the image, each text zone comprising textual content and having a respective rank assigned thereto based on an arrangement of the text zones within the image;
    determining a processing sequence for performing optical character recognition on the text zones, the processing sequence being based, firstly, on an arrangement of the text zones with respect to the region of interest and, secondly, on the ranks assigned to the text zones; and
    performing an optical character recognition process on the text zones according to the processing sequence to progressively obtain a machine-encoded representation of the region of interest, and concurrently present said machine-encoded representation to the user, via an output device, as the text-based representation.

2. The computer-implemented method according to claim 1, wherein determining the processing sequence comprises:
    identifying, among the text zones, at least one primary text zone, each intersecting the region of interest; and
    placing the at least one primary text zone at the beginning of the processing sequence and, if more than one primary text zone is identified, ordering said primary text zones according to the respective rank thereof.

3. The computer-implemented method according to claim 2, wherein determining the processing sequence comprises:
    identifying, among the text zones, at least one secondary text zone, each being ranked between a highest-ranked and a lowest-ranked of the at least one primary text zone; and
    placing the at least one secondary text zone immediately after the at least one primary text zone in the processing sequence and, if more than one secondary text zone is identified, ordering said secondary text zones according to the respective rank thereof.

4. The computer-implemented method according to claim 3, wherein determining the processing sequence comprises:
    identifying, among the text zones, at least one tertiary text zone, each being ranked below the lowest-ranked of the at least one primary text zone; and
    placing the at least one tertiary text zone immediately after the at least one secondary text zone in the processing sequence and, if more than one tertiary text zone is identified, ordering said tertiary text zones according to the respective rank thereof.

5. The computer-implemented method according to claim 4, wherein determining the processing sequence comprises:
    identifying, among the text zones, at least one quaternary text zone, each being ranked above the highest-ranked of the at least one primary text zone; and
    placing the at least one quaternary text zone immediately after the at least one tertiary text zone in the processing sequence and, if more than one quaternary text zone is identified, ordering said quaternary text zones according to the respective rank thereof.

6. The computer-implemented method according to claim 1, wherein determining the processing sequence comprises placing a highest-ranked text zone intersecting the region of interest at the beginning of the processing sequence.

7. The computer-implemented method according to claim 6, wherein determining the processing sequence comprises placing, immediately after the highest-ranked text zone intersecting the region of interest and according to the respective rank thereof, each text zone being ranked below the highest-ranked text zone intersecting the region of interest, followed by each text zone being ranked above the highest-ranked text zone intersecting the region of interest.

8. The computer-implemented method according to claim 1, wherein performing the optical character recognition process on the text zones comprises obtaining machine-encoded text corresponding to the textual content of each text zone, and wherein presenting the machine-encoded representation of the region of interest comprises replacing, in the image, the textual content of each text zone intersecting the region of interest with the corresponding machine-encoded text.

9. The computer-implemented method according to claim 8, wherein replacing the textual content of each text zone intersecting the region of interest with the corresponding machine-encoded text is performed according to the processing sequence.

10. The computer-implemented method according to claim 8, wherein replacing the textual content of each text zone intersecting the region of interest with the corresponding machine-encoded text is performed, for each text zone, before obtaining the machine-encoded text of the following text zone in the processing sequence.

11. The computer-implemented method according to claim 7, wherein replacing the textual content of each text zone comprises overlaying, as vector graphics, the machine-encoded text of each text zone on the corresponding textual content within the image.

12. The computer-implemented method according to claim 1, wherein presenting the machine-encoded representation of the region of interest comprises rendering textual content within the region of interest as vector graphics.

13. The computer-implemented method according to claim 1, wherein, upon a change in at least one of a size and a position of the region of interest, determining the processing sequence further comprises recalculating the processing sequence of unprocessed ones of the text zones based, firstly, on the arrangement of the unprocessed ones of the text zones with respect to the region of interest after said change and, secondly, on the ranks of the unprocessed ones of the text zones.

14. The computer-implemented method according to claim 1, further comprising, before the step of identifying the text zones within the image, a step of imposing a size limit on the text zones.

15. A non-transitory computer readable memory storing computer executable instructions thereon that when executed by a computer perform the method steps of claim 1.

16. A method for providing a text-based representation of a portion of a working area to a user, the method comprising the steps of:

acquiring an image of the entire working area;

identifying text zones within the image, each text zone comprising textual content and having a respective rank assigned thereto based on an arrangement of the text zones within the image;

determining a processing sequence for performing optical character recognition on the text zones, the processing sequence being based, firstly, on an arrangement of the text zones with respect to a region of interest of the image corresponding to the portion of the working area and, secondly, on the ranks assigned to the text zones; and performing an optical character recognition process on the text zones according to the processing sequence to progressively obtain a machine-encoded representation of the portion of the working area, and concurrently present said machine-encoded representation to the user as the text-based representation.

17. A system for providing a text-based representation of a portion of a working area to a user, the system comprising:

a camera unit disposed over the working area and having an image sensor acquiring an image of the entire working area; and a processing unit receiving the image from the camera unit and comprising:

a zoning module identifying text zones within the image, each text zone comprising textual content and having a respective rank assigned thereto based on an arrangement of the text zones within the image;

a sequencing module determining a processing sequence for performing optical character recognition on the text zones, the processing sequence being based, firstly, on an arrangement of the text zones with respect to a region of interest of the image corresponding to the portion of the working area and, secondly, on the ranks assigned to the text zones;

an OCR module performing an optical character recognition process on the text zones according to the processing sequence to progressively obtain a machine-encoded representation of the portion of the working area; and an output module concurrently outputting, as the text-based representation, the machine-encoded representation of the portion of the working area.

* * * * *